(12) United States Patent
Hosoi et al.

(10) Patent No.: US 11,927,458 B2
(45) Date of Patent: Mar. 12, 2024

(54) MAP INFORMATION CORRECTION APPARATUS, MOBILE OBJECT, MAP INFORMATION CORRECTION SYSTEM, MAP INFORMATION CORRECTION METHOD, CONTROL CIRCUIT, AND NON-TRANSITORY STORAGE MEDIUM

(71) Applicant: MITSUBISHI ELECTRIC CORPORATION, Tokyo (JP)

(72) Inventors: Kyoko Hosoi, Tokyo (JP); Takashi Sugihara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 222 days.

(21) Appl. No.: 17/383,543

(22) Filed: Jul. 23, 2021

(65) Prior Publication Data

US 2021/0348943 A1 Nov. 11, 2021

Related U.S. Application Data

(63) Continuation of application No. PCT/JP2019/011037, filed on Mar. 18, 2019.

(51) Int. Cl.
*G01C 21/00* (2006.01)
*G01C 21/36* (2006.01)

(52) U.S. Cl.
CPC ...... *G01C 21/3811* (2020.08); *G01C 21/3691* (2013.01); *G01C 21/3833* (2020.08)

(58) Field of Classification Search
CPC .................................. G01C 21/3804–3848
See application file for complete search history.

(56) References Cited

U.S. PATENT DOCUMENTS

| | | | |
|---|---|---|---|
| 8,676,429 B2 | 3/2014 | Nakano et al. | |
| 2010/0198513 A1* | 8/2010 | Zeng | G01S 13/931 |
| | | | 701/300 |
| 2017/0307743 A1* | 10/2017 | Izzat | G01S 13/04 |
| 2018/0149487 A1* | 5/2018 | Lee | G01C 21/3841 |
| 2019/0025071 A1* | 1/2019 | Fukui | G01C 21/3635 |

FOREIGN PATENT DOCUMENTS

| | | |
|---|---|---|
| JP | 2011-118591 A | 6/2011 |
| JP | 2014-115247 A | 6/2014 |
| JP | 2017-181870 A | 10/2017 |
| JP | 2019-40175 A | 3/2019 |
| WO | WO 2018/221458 A1 | 12/2018 |

\* cited by examiner

*Primary Examiner* — Aaron L Troost
(74) *Attorney, Agent, or Firm* — Birch, Stewart, Kolasch & Birch, LLP

(57) ABSTRACT

A map information correction apparatus includes a feature point priority determination unit that determines a priority for a feature point of own mobile object surrounding information. A feature pair priority determination unit gives, when there is one or more feature pairs, a priority to the feature pair, based on an own mobile object surrounding information priority of the feature pair and a map information priority of the feature pair. The feature pair is a pair of an own mobile object surrounding information feature point and a received map information feature point that correspond to each other. An error calculation unit calculates an error in the map information, based on a high-priority own mobile object surrounding information feature point and a high-priority map information feature point. A correction unit corrects the map information using the error.

15 Claims, 11 Drawing Sheets

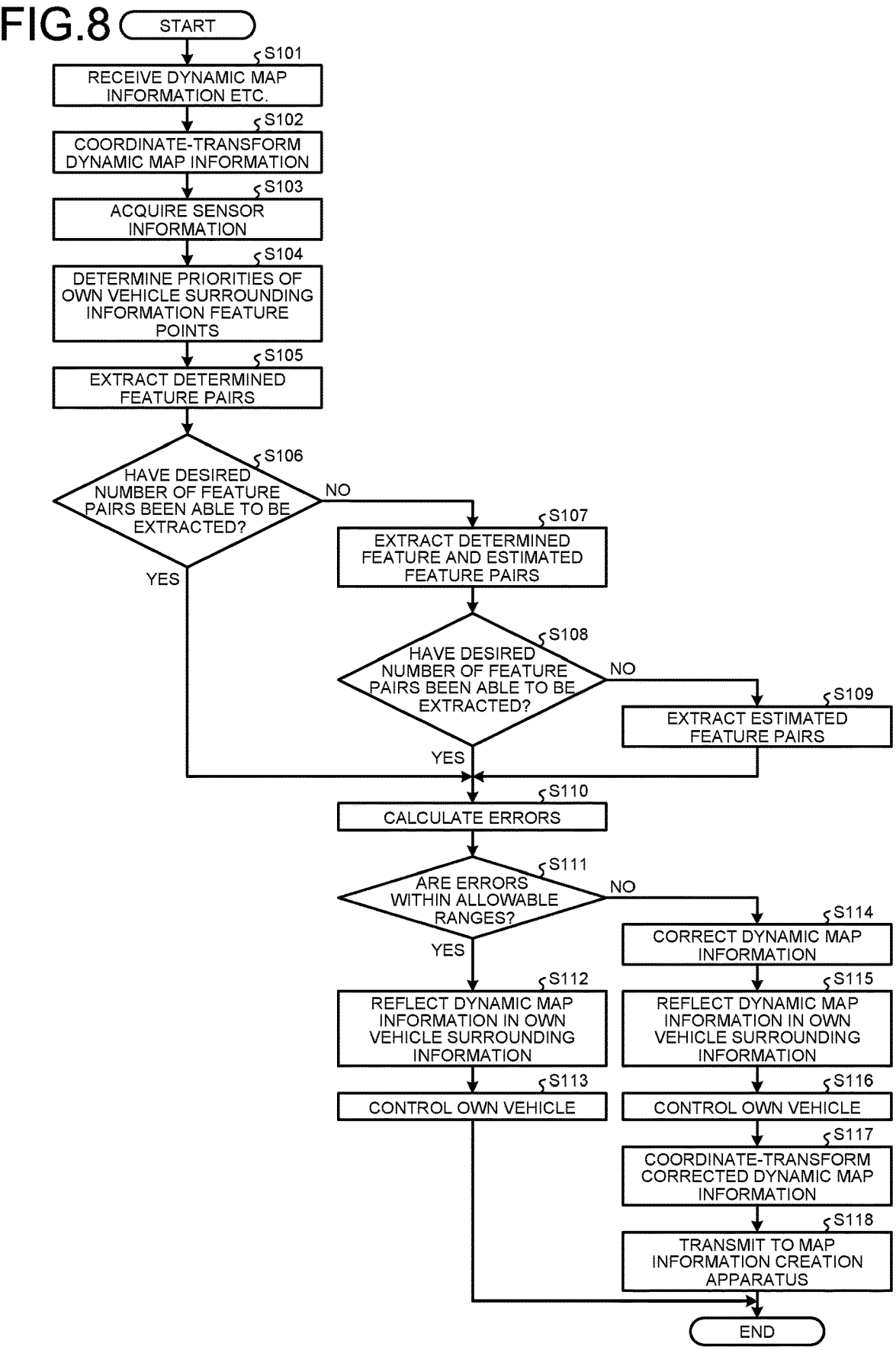

FIG.9

| DETERMINED FEATURE POINTS | ESTIMATED FEATURE POINTS |
|---|---|
| INFORMATION ACQUIRED BY GPS | INFORMATION ACQUIRED BY LOW-RELIABILITY Radar |
| VEHICLE TYPE INFORMATION ACQUIRED BY CAMERA (SUCH AS LARGE VEHICLE OR SMALL VEHICLE) | INFORMATION CALCULATED FROM GPS AND CAMERA (INFORMATION CALCULATED FROM POSITION INFORMATION AND VEHICLE SIZE INFORMATION) |
| INFORMATION ON VEHICLE CORNER ACQUIRED BY Lidar | INFORMATION ESTIMATED FROM ANOTHER FEATURE POINT |
| ⋮ | ⋮ |

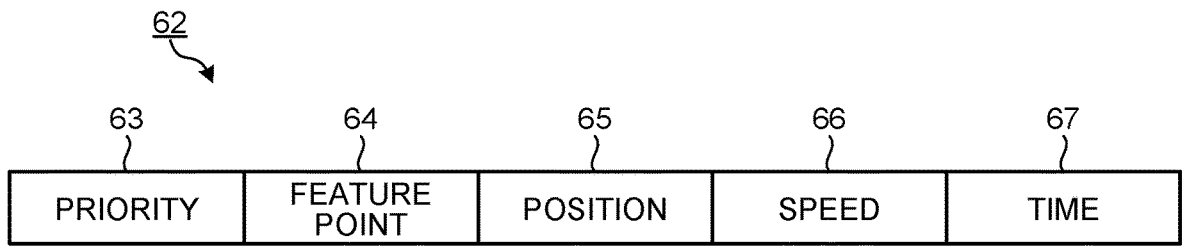

FIG.13

| DEFINITE FEATURE POINTS | DETERMINED FEATURE POINTS | ESTIMATED FEATURE POINTS |
|---|---|---|
| INFORMATION CALCULATED FROM INFORMATION ACQUIRED BY GPS ON OWN VEHICLE AND VEHICLE SIZE OF OWN VEHICLE | INFORMATION ON TYPE OF ANOTHER VEHICLE ACQUIRED BY CAMERA (SUCH AS LARGE VEHICLE OR SMALL VEHICLE) | INFORMATION ACQUIRED BY LOW-RELIABILITY Radar |
|  | INFORMATION ON CORNER OF ANOTHER VEHICLE ACQUIRED BY Lidar | INFORMATION ESTIMATED FROM ANOTHER FEATURE POINT |
| ⋮ | ⋮ | ⋮ |

FIG.14

| FEATURE POINTS | PRIORITIES |
|---|---|
| INFORMATION CALCULATED FROM INFORMATION ACQUIRED BY GPS ON OWN VEHICLE AND VEHICLE SIZE OF OWN VEHICLE | 1 |
| INFORMATION ON TYPE OF ANOTHER VEHICLE ACQUIRED BY CAMERA (SUCH AS LARGE VEHICLE OR SMALL VEHICLE) | 2 |
| INFORMATION ON CORNER OF ANOTHER VEHICLE ACQUIRED BY Lidar | 2 |
| INFORMATION ACQUIRED BY LOW-RELIABILITY Radar | 3 |
| INFORMATION ESTIMATED FROM ANOTHER FEATURE POINT | 3 |
| ⋮ | ⋮ |

MAP INFORMATION CORRECTION APPARATUS, MOBILE OBJECT, MAP INFORMATION CORRECTION SYSTEM, MAP INFORMATION CORRECTION METHOD, CONTROL CIRCUIT, AND NON-TRANSITORY STORAGE MEDIUM

CROSS-REFERENCE TO RELATED APPLICATION

This application is a continuation application of International Application PCT/JP2019/011037, filed on Mar. 18, 2019, and designating the U.S., the entire contents of which are incorporated herein by reference.

BACKGROUND OF THE INVENTION

1. Field of the Invention

The disclosure relates to a map information correction apparatus that corrects a map, a mobile object equipped with the map information correction apparatus, a map information correction system, a map information correction method, a control circuit, and a non-transitory storage medium.

2. Description of the Related Art

In the fields of driving assistance and automatic driving using map information, there is a technology of transmitting map information between a mobile object and a server to allow the mobile object to move on the basis of the map information received from the server. For example, to establish a smooth transportation network requires a change from conventional driving by a human driver to automatic driving by a driver implemented with a system such as artificial intelligence. To implement the automatic driving requires not only a long-period updated map showing only information on static objects such as roads and buildings (hereinafter referred to as static information) but also a map updated in a short period of, for example, less than 100 milliseconds. Such a short-period updated map, which is called a dynamic map, includes various types of information including information on dynamic objects such as movement of surrounding vehicles and humans (hereinafter referred to as dynamic information). The dynamic map is updated on the basis of information transmitted from a plurality of roadside sensors such as radars and cameras installed on the roadside and vehicle-onboard equipment including various sensors, and holds dynamic information.

The dynamic map is intended to hold highly accurate dynamic information. To practically introduce the dynamic map into a self-driving vehicle require to design a system taking into account the occurrence of situations where highly accurate dynamic object position information (hereinafter referred to as dynamic position information) is not reflected in the dynamic map. The situations where highly accurate dynamic position information is not reflected in the dynamic map are, for example, where there is a large amount of traffic of vehicles not equipped with sensors, where there is a large amount of traffic of vehicles not equipped with sensors with sufficient accuracy to update the dynamic map, and where existence of vehicles not equipped with sensors increases the region undetectable by a roadside sensor group, which results in increased vehicles in blind spots from the roadside sensor group. The dynamic map generated in such situations includes many errors.

For a self-driving vehicle to determine an appropriate travel path even when a dynamic map including highly accurate dynamic information cannot be created, there is a need for a mechanism that reduces errors included in the dynamic map and reflects the reduced errors in the self-driving vehicle.

Japanese Patent Application Laid-open No. 2017-181870 discloses a technique for reducing errors in map information. For this disclosed technique, a map information correction apparatus matches a feature point acquired from information detected in a unit space by a sensor installed on a vehicle against a feature point stored in a reference map, to evaluate the consistency on the basis of a distance between the feature points. When the information is evaluated to be inconsistent, the map information correction apparatus transmits, to an information processing server, the information detected by the sensor installed on the vehicle. The information processing server sends other map information correction apparatuses the commands to cause a plurality of vehicles equipped with the other map information correction apparatuses to acquire information on the unit space evaluated to be inconsistent. The other map information correction apparatuses transmit, to the information processing server, the unit-space information evaluated to be inconsistent. The information processing server reflects, in the reference map, the information acquired by the other map information correction apparatuses.

Unfortunately, the conventional map information correction apparatus described above has a problem of taking too much time to correct a short-period updated map such as a dynamic map, and thus cannot be applied to automatic driving, collision avoidance warning, etc.

The disclosure has been made to solve problems as described above. It is an object of the disclosure to provide a map information correction apparatus, a mobile object, a map information creation apparatus, a map information correction system, a map information correction method, and a map information correction program capable of correcting a short-period updated map such as a dynamic map.

SUMMARY OF THE INVENTION

A map information correction apparatus according to the disclosure includes: a feature point priority determination unit to determine, on a basis of a preset priority table, a priority for one or more feature points of own mobile object surrounding information including at least one of sensor information acquired from a sensor installed on an own mobile object and calculation sensor information calculated from the sensor information; a feature pair priority determination unit to give, when there is one or more feature pairs, a priority to the feature pair on the basis of an own mobile object surrounding information priority and a map information priority, the feature pair being a pair of an own mobile object surrounding information feature point and a map information feature point that correspond to each other, the own mobile object surrounding information feature point being the feature point of the own mobile object surrounding information, the map information feature point being a feature point of map information received, the own mobile object surrounding information priority being a priority of the own mobile object surrounding information feature point of the feature pair, the map information priority being a priority of the map information feature point of the feature pair; an error calculation unit to calculate an error in the map information on the basis of a high-priority own mobile object surrounding information feature point and a high-priority map information feature point, the high-priority own mobile object surrounding information feature point being the own mobile object surrounding information feature point, the high-priority map information feature point being the map information feature point, the own mobile object surrounding information feature point and the map information feature point forming the one or more feature pairs of a high priority; and a correction unit to correct the map information using the error.

A map information creation apparatus according to the disclosure includes: a transmission and reception unit to receive at least one of sensor information and correction map information that is map information corrected and correction map information priority information that is priority information on a feature point of the correction map information; a feature point priority determination unit to determine a priority for the one or more feature points of the sensor information, on a basis of a preset priority table when the transmission and reception unit receives the sensor information; and a creation unit to create the map information, using at least one of the sensor information to which information on the priority of the feature point has been given, and the correction map information and the correction map information priority information.

BRIEF DESCRIPTION OF THE DRAWINGS

FIG. 8 is a flowchart illustrating the operation of a vehicle including the map information correction apparatus according to the first embodiment;

FIG. 9 is a priority table in which determined feature points and estimated feature points are stored according to the first embodiment;

FIG. 10 is an example of a part of own vehicle surrounding information to which the priority of a feature point is given according to the first embodiment;

FIG. 13 is a priority table in which definite feature points, determined feature points, and estimated feature points are stored according to the second embodiment; and FIG. 14 is another example of a priority table in which the priorities of feature points are stored according to the second embodiment.

DETAILED DESCRIPTION OF THE PREFERRED EMBODIMENTS

First Embodiment

In a first embodiment, a case where a mobile object is a vehicle, and map information is dynamic map information will be described below as an example. Here, a dynamic map in the first embodiment is, as an example, a map including dynamic information with a high frequency of update, information on feature points of the dynamic information, and position information, speed information, and time information on the feature points. In own vehicle surrounding information that is vehicle information, as an example, dynamic information on the surroundings is represented by feature points.

Figure 1:
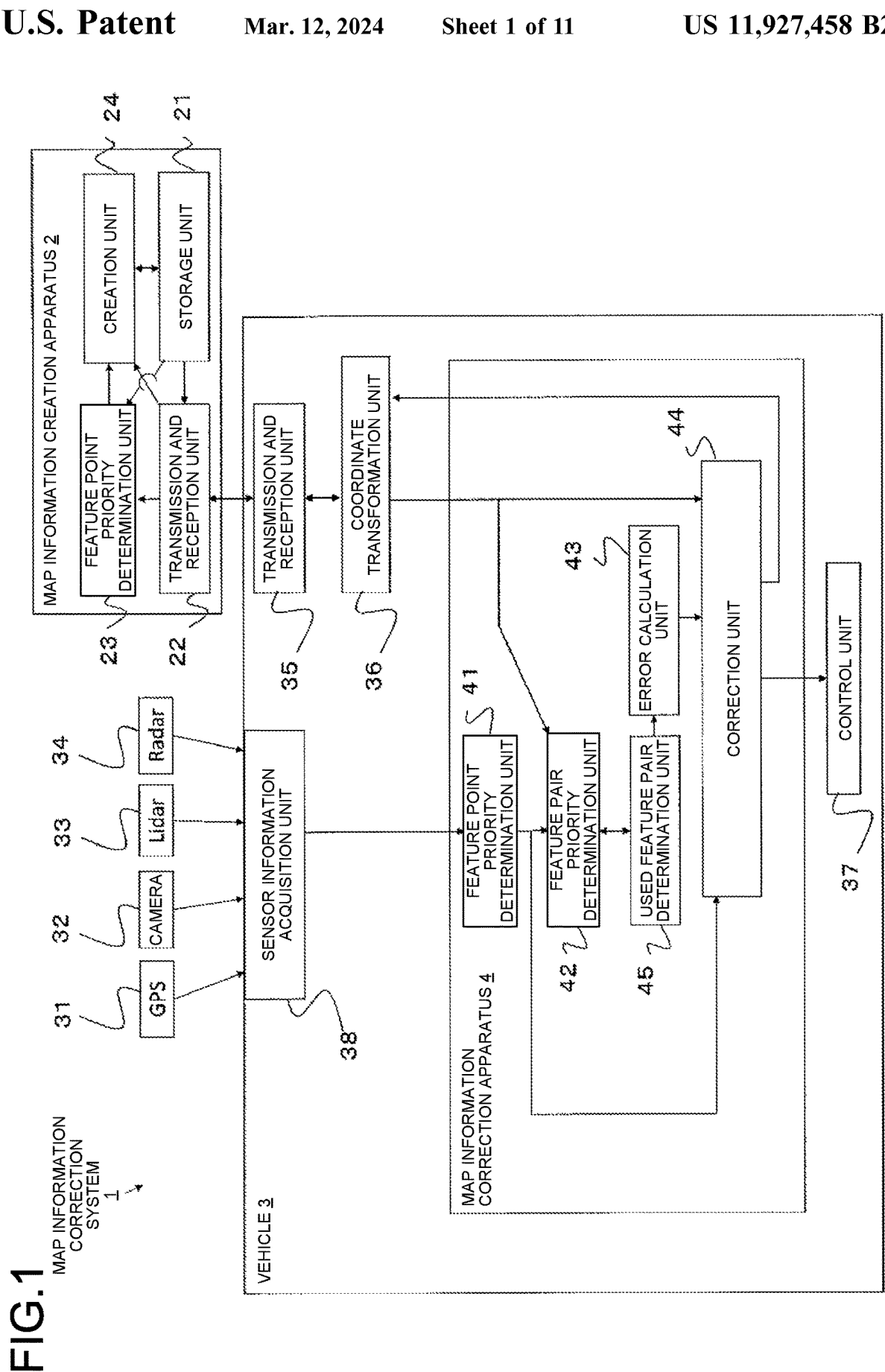
FIG. 1 is a functional block diagram of a map information correction system according to a first embodiment.

FIG. 1 is a functional block diagram of a map information correction system 1 according to the first embodiment.

In FIG. 1, the map information correction system 1 includes a map information creation apparatus 2 that creates dynamic map information, and a vehicle 3 that performs driving control etc. using the dynamic map information.

In the map information correction system 1, the vehicle 3 receives, from the map information creation apparatus 2, the dynamic map information and priority information on feature points included in the dynamic map information. The vehicle 3 gives priorities to feature points included in own vehicle surrounding information including sensor information etc., and gives priorities to feature pairs. The feature pair is a pair of a feature point of the dynamic map information and a corresponding feature point of the own vehicle surrounding information. The vehicle 3 corrects the dynamic map information on the basis of the priorities of the feature pairs. The key point of the map information correction system 1 is to correct the dynamic map information on the basis of the priorities of the feature pairs, which will be detailed below.

As an example, the map information creation apparatus 2 distributes dynamic information using a dynamic map including information on feature points of the dynamic information. The map information creation apparatus 2 creates dynamic map information, updates the dynamic map information, and transmits and receives the dynamic map information to and from the vehicle 3. The map information creation apparatus 2 includes a storage unit 21, a transmission and reception unit 22, a feature point priority determination unit 23, and a creation unit 24. The storage unit 21 stores dynamic map information and information on the priorities of dynamic map information feature points. The dynamic map information feature points are feature points included in the dynamic map information. The transmission and reception unit 22 transmits and receives the dynamic map information and the information on the priorities of the dynamic map information feature points to and from the vehicle 3. The feature point priority determination unit 23 determines the priorities of the dynamic map information feature points. The creation unit 24 that creates the dynamic map information. Here, the dynamic map information feature points are an example of map information feature points.

The storage unit 21 stores the dynamic map information and dynamic map information priority information. The dynamic map information priority information is the information on the priorities of the dynamic map information feature points used to determine the priorities of feature pairs. If the dynamic map information is corrected, the storage unit 21 stores correction dynamic map information that is the corrected dynamic map information. To correct the dynamic map information, the storage unit 21 may store sensor information collected from roadside sensors installed on roads or at buildings and from the vehicle 3, etc. The priority of the dynamic map information feature point is a dynamic map information priority, and the dynamic map information priority is an example of a map information priority. The correction dynamic map information is an example of corrected map information.

The transmission and reception unit 22 transmits, to the vehicle 3, the dynamic map information and the dynamic map information priority information stored in the storage unit 21. The transmission and reception unit 22 receives, from the vehicle 3 or the roadside sensors (not illustrated) installed on roads or at buildings, sensor information collected from the roadside sensors or the vehicle 3, the correction dynamic map information, and the dynamic map information priority information.

The transmission and reception unit 22 may transmit, to the vehicle 3, the dynamic map information and the dynamic map information priority information stored in the storage unit 21 when the vehicle 3 requests transmission of the dynamic map information and the dynamic map information priority information. Alternatively, the transmission and reception unit 22 may transmit the dynamic map information and the dynamic map information priority information to the vehicle 3 according to a fixed cycle or a rule.

When the transmission and reception unit 22 receives sensor information, the feature point priority determination unit 23 determines priorities for dynamic map information feature points of the sensor information. Specifically, in creating dynamic map information, the feature point priority determination unit 23 determines that dynamic map information feature points directly measured from sensors of particularly high reliability such as roadside sensors installed on roads or at buildings are "determined feature points".

Figure 2:
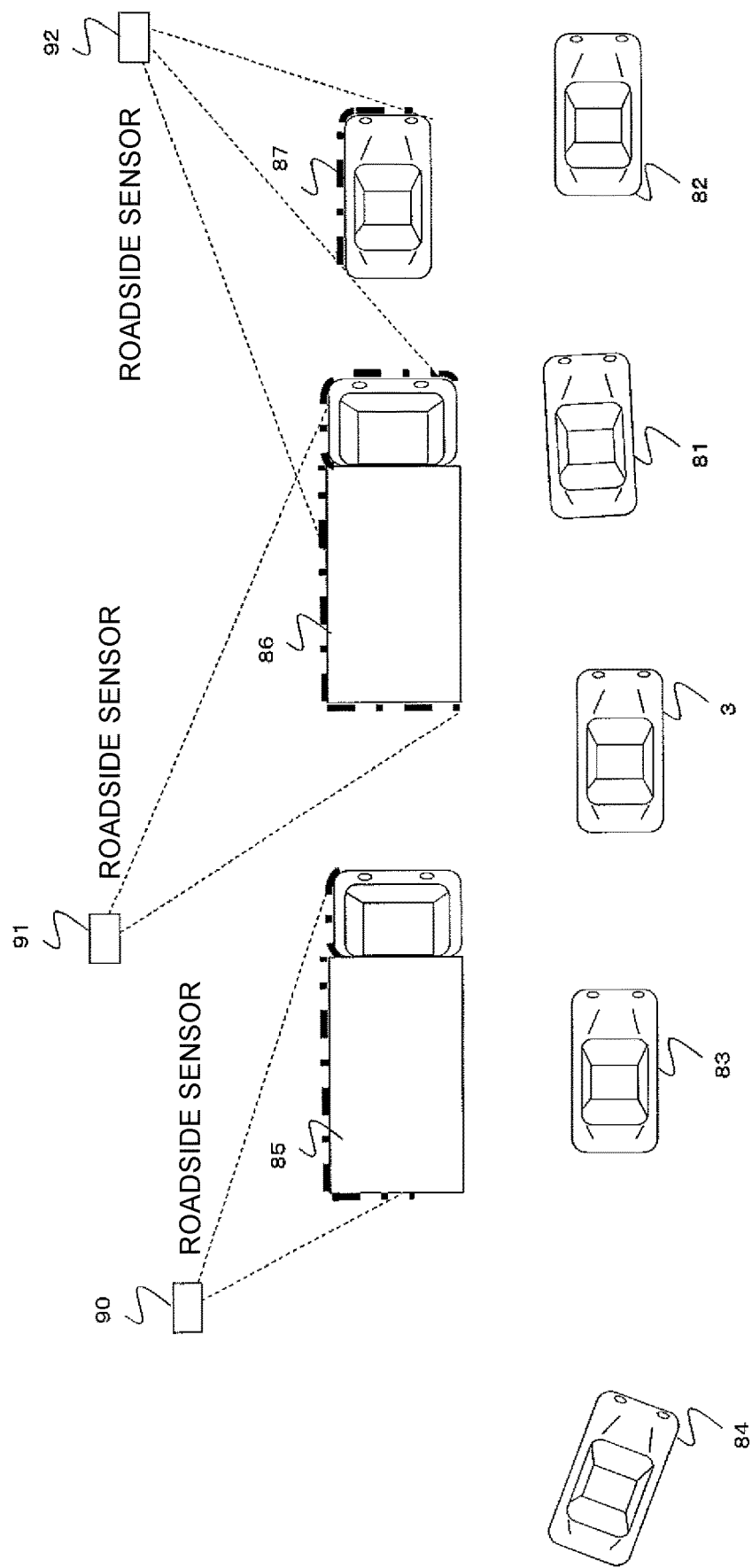
FIG. 2 is a conceptual diagram of positions of vehicles that can be directly measured from roadside sensors according to the first embodiment.

The determined feature points will be described. FIG. 2 is a conceptual diagram of positions of vehicles that can be directly measured from roadside sensors 90 to 92 according to the first embodiment.

The positions of the vehicles that can be directly measured from the roadside sensors 90 to 92 will be described with reference to FIG. 2. In FIG. 2, the ranges of the vehicles that can be directly measured by the roadside sensors 90 to 92 are ranges indicated by dotted lines. Thus, the roadside sensors 90 to 92 can directly measure parts of the vehicles 85 to 87, which parts are indicated by dot-dash lines. If the roadside sensors 90 to 92 are sensors of particularly high reliability, and the dot-dash-line parts include feature points, the feature points are identified as determined feature points.

Returning back to FIG. 1, the feature point priority determination unit 23 determines that dynamic map information feature points detected as a result of direct measurement by a sensor of low reliability, or estimated from the sizes of mobile objects or other feature points are "estimated feature points" in the dynamic map information.

Figure 3:
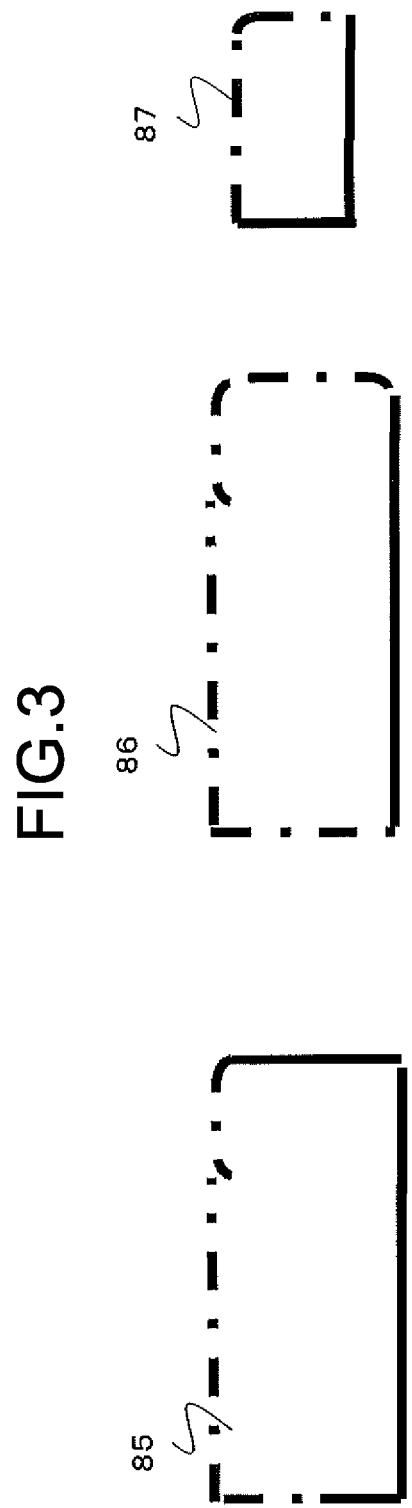
FIG. 3 is a conceptual diagram of positions of the vehicles estimated from the sizes of the vehicles and other feature points according to the first embodiment.

Estimated feature points such as positions of vehicles estimated from the sizes of the vehicles or other feature points will be described. FIG. 3 is a conceptual diagram of positions of vehicles estimated from the sizes of the vehicles or other feature points according to the first embodiment.

In FIG. 3, the positions of the vehicles that can be directly measured from the roadside sensors 90 to 92 are parts of the vehicles 85 to 87 indicated by dot-dash lines. On the other hand, positions of the vehicles that cannot be directly measured from the roadside sensors 90 to 92 and are estimated from the sizes of the vehicles or other feature points are parts of the vehicles 85 to 87 indicated by straight lines. If the straight lines include feature points, the feature points are identified as estimated feature points.

Reference is made back to FIG. 1. Information indicating which of the determined feature point and the estimated feature point the feature point priority determination unit 23 determines a dynamic map information feature point to be is dynamic map information priority information. Assume that an agreement is made in advance between the map information creation apparatus 2 and the vehicle 3 as to what portions should be extracted as feature points. For example, the agreement is made in advance between the map information creation apparatus 2 and the vehicle 3 that the corners of vehicles and the tail lamps of vehicles should be extracted as feature points. The feature point priority determination unit 23 transmits, to the creation unit 24, the sensor information received from the transmission and reception unit 22 and the dynamic map information priority information on the sensor information.

The creation unit 24 creates and updates dynamic map information on the basis of sensor information, correction dynamic map information received from the vehicle 3, dynamic map information priority information on the sensor information, and correction dynamic map information priority information. The correction dynamic map information priority information, which is a corrected dynamic map information priority information corrected, is received from the vehicle 3. The creation unit 24 stores the created dynamic map information and the created dynamic map information priority information in the storage unit 21. The correction dynamic map information priority information is an example of corrected map information priority information.

Next, the vehicle 3 in FIG. 1 will be described.

The vehicle 3 includes a transmission and reception unit 35, a coordinate transformation unit 36, a control unit 37, a sensor information acquisition unit 38, and a map information correction apparatus 4. The transmission and reception unit 35 transmits and receives information to and from the map information creation apparatus 2. The coordinate transformation unit 36 performs coordinate transformation on dynamic map information transmitted and received to and from the map information creation apparatus 2. The control unit 37 controls the vehicle 3, using corrected dynamic map information etc. The sensor information acquisition unit 38 acquires sensor information. The map information correction apparatus 4 corrects the dynamic map information.

The sensor information acquisition unit 38 acquires sensor information from at least one of a GPS 31, a camera 32, a Lidar 33, and a Radar 34. The GPS 31 acquires sensor information that is information on the position of the vehicle 3 from a satellite (not illustrated). The camera 32 acquires sensor information that is information on an image of the surrounding environment of the vehicle 3. The Lidar 33, which is light detection and ranging, uses laser light to acquire sensor information that is object detection information and/or information on the distance from the vehicle 3 to an object. The Radar 34 uses radio waves to acquire sensor information that is object detection information and/or information on the distance from the vehicle 3 to an object.

The transmission and reception unit 35 receives dynamic map information and dynamic map information priority information transmitted from the map information creation apparatus 2. The transmission and reception unit 35 transmits correction dynamic map information and correction dynamic map information priority information to the map information creation apparatus 2.

The coordinate transformation unit 36 performs coordinate transformation on dynamic map information to be transmitted and received to and from the map information creation apparatus 2. The map information creation apparatus 2 transmits dynamic map information to a large number of vehicles. For this reason, in many cases, the map information creation apparatus 2 stores information on the positions of mobile objects in coordinates different from such a coordinate system for information held by the vehicle 3 as easily recognized by a vehicle, like a coordinate system centering that vehicle. The coordinate transformation unit 36 thus coordinate-transforms the coordinates of dynamic map information received from the map information creation apparatus 2 into a coordinate corresponding to information held by the vehicle 3. In addition, the coordinate transformation unit 36 coordinate-transforms the coordinates of correction dynamic map information to be transmitted from the vehicle 3 to the map information creation apparatus 2 into a coordinate corresponding to the dynamic map information held by the map information creation apparatus 2.

The dynamic map information received from the map information creation apparatus 2 and then coordinate-transformed is defined as vehicle coordinate dynamic map information. Meanwhile, the dynamic map information distributed from the map information creation apparatus 2 to a large number of vehicles is defined as map coordinate dynamic map information.

The control unit 37 uses the results of reflecting sensor information of the own vehicle and dynamic map information output from the map information correction apparatus 4 to perform control of the vehicle 3 such as determination of an optimal travel path or a collision avoidance alert.

Next, the map information correction apparatus 4 in FIG. 1 will be described.

The map information correction apparatus 4 includes a feature point priority determination unit 41 a feature pair priority determination unit 42 an error calculation unit 43, and a correction unit 44. The feature point priority determination unit 41 determines the priorities of feature points included in own vehicle surrounding information including sensor information and calculation sensor information calculated from the sensor information. The feature pair priority determination unit 42 gives priorities to feature pairs on the basis of dynamic map information priorities and the priorities of the feature points included in the own vehicle surrounding information. The used feature pair determination unit 45 determines whether or not the number of feature pairs is larger than or equal to a use threshold. The error calculation unit 43 calculates errors in dynamic map information feature points. The correction unit 44 corrects dynamic map information.

The feature point priority determination unit 41 receives sensor information from the sensor information acquisition unit 38 installed on the vehicle 3. The feature point priority determination unit 41 calculates calculation sensor information from the sensor information. For example, the feature point priority determination unit 41 calculates position information that is the calculation sensor information, from speed information and time information received as radio waves. The speed information is sensor information provided by a speed sensor. The feature point priority determination unit 41 compiles the sensor information and the calculation sensor information into one piece of own vehicle surrounding information. The own vehicle surrounding information is an example of own mobile object surrounding information. The own vehicle surrounding information includes at least one of the sensor information and the calculation sensor information. The sensor information here is not raw data of sensors, but is subjected to data processing into a form that can be used by the map information correction apparatus 4. The sensor information may be raw data or data subjected to data processing as long as it is in a form that can be used in the map information correction apparatus 4.

The feature point priority determination unit 41 extracts one or more own vehicle surrounding information feature points that are feature points of the own vehicle surrounding information. The feature point priority determination unit 41 determines own vehicle surrounding information priorities that are the priorities of the own vehicle surrounding information feature points. Using, for example, a previously stored priority table in which determined feature points and estimated feature points are stored, the feature point priority determination unit 41 determines whether the own vehicle surrounding information feature point is a determined feature point or an estimated feature point, as an own vehicle surrounding information priority. The feature point priority determination unit 41 has stored own vehicle surrounding information feature points in the priority table. The own vehicle surrounding information feature point directly measured from, for example, a sensor installed on the vehicle is stored as a determined feature point in the priority table. The own vehicle surrounding information feature point detected as a result of direct measurement by a sensor of low reliability, or estimated from the size of a mobile object or another feature point is stored as an estimated feature point in the priority table. The feature point priority determination unit 41 determines whether a predetermined feature point corresponds to a determined feature point or an estimated feature point, as in the feature point priority determination unit 23. The own vehicle surrounding information feature point is an example of an own mobile object surrounding information feature point. The own vehicle surrounding information priority is an example of an own mobile object surrounding information priority.

Figure 4:
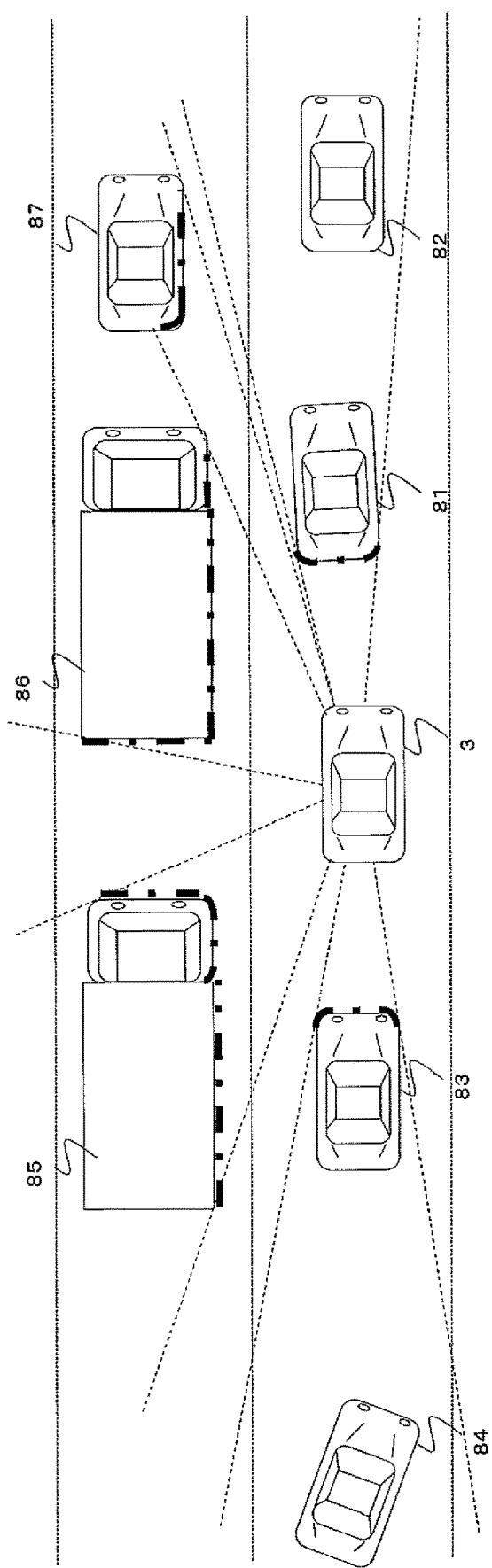
FIG. 4 is a conceptual diagram of positions of vehicles that can be directly measured from an own vehicle according to the first embodiment.

The positions of vehicles that can be directly measured from the vehicle 3 will be described with reference to FIG. 4. FIG. 4 is a conceptual diagram of positions of vehicles that can be directly measured from the vehicle 3 according to the first embodiment.

In FIG. 4, the ranges of the vehicles that can be directly measured by sensors installed on the vehicle 3 are ranges indicated by dotted lines. Thus, the vehicle 3 can directly measure parts of the vehicles 81, 83, and 85 to 87, which parts are indicated by dot-dash lines. If the dot-dash-line parts include feature points, the feature points are identified as determined feature points.

Returning to FIG. 1, the feature point priority determination unit 41 determines that an own vehicle surrounding information feature point detected as a result of direct measurement by a sensor of low reliability, or not directly measured but estimated from information on the size of a mobile object or another feature point, for example, is an estimated feature point in the own vehicle surrounding information, for storage. The concept of an estimated feature point is similar to that as discussed in relation to the feature point priority determination unit 23. The feature point priority determination unit 41 gives the own vehicle surrounding information own vehicle surrounding information priority information that is priority information indicating whether an own vehicle surrounding information feature point is a determined feature point or an estimated feature point. Assume that an agreement is made in advance between the map information creation apparatus 2 and the vehicle 3 as to what portions should be extracted as feature points. For example, the agreement is made in advance between the map information creation apparatus 2 and the vehicle 3 that the corners of vehicles and the tail lamps of vehicles should be extracted as feature points. The feature point priority determination unit 41 transmits, to the feature pair priority determination unit 42 and the correction unit 44, the own vehicle surrounding information to which the own vehicle surrounding information priority information has been given.

The feature pair priority determination unit 42 extracts corresponding feature points included in the own vehicle surrounding information and the dynamic map information priority information, and extracts, as determined feature pairs, determined feature points among the corresponding feature points. Combining the types of feature points such as the corners of vehicles and the tail lamps of vehicles with the attributes of feature points such as vehicle types, positions, and speeds, the feature pair priority determination unit 42 determines whether or not the dynamic map information feature points correspond to the own vehicle surrounding information feature points.

Figure 5:
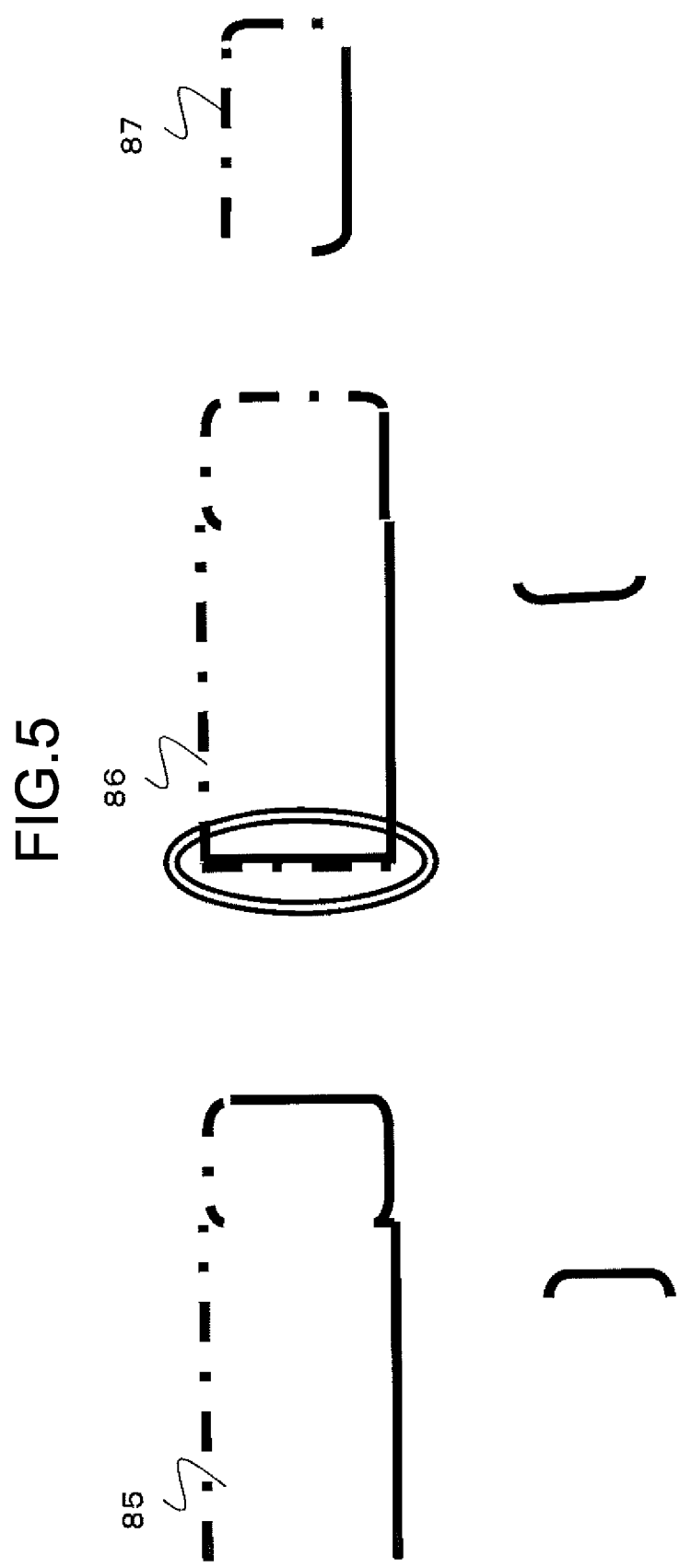
FIG. 5 is a conceptual diagram of a determined feature pair according to the first embodiment.

FIG. 5 is a conceptual diagram of a determined feature pair according to the first embodiment.

A determined feature pair will be described with reference to FIG. 5. In FIG. 5, positions of vehicles that can be directly measured from the vehicle 3 are positions indicated by straight lines. In FIG. 5, positions of the vehicles that can be directly measured from the roadside sensors 90 to 92 included in the dynamic map information priority information are positions indicated by dot-dash lines. The position enclosed by a double line in which the straight line coincides with the dot-dash line is not only a position of a vehicle that can be directly measured from the vehicle 3 but also a position of a vehicle that can be directly measured from the roadside sensors 90 to 92 included in the dynamic map information priority information. If both the own vehicle surrounding information and the dynamic map information priority information include determined feature points in this portion enclosed by the double line, these feature points are identified as a determined feature pair.

Returning to FIG. 1, the feature pair priority determination unit 42 transmits determined feature pairs to the used feature pair determination unit 45. If the feature pair priority determination unit 42 receives a request to further extract feature pairs to be used for error calculation from the used feature pair determination unit 45 that determines feature pairs to be used for error calculation, the feature pair priority determination unit 42 further extracts determined feature and estimated feature pairs. The determined feature and estimated feature pair is a combination of a determined feature point and an estimated feature point. If the feature pair priority determination unit 42 receives a request to further extract feature pairs to be used for error calculation from the used feature pair determination unit 45, the feature pair priority determination unit 42 further extracts estimated feature pairs. The estimated feature pair is a combination of estimated feature points.

The used feature pair determination unit 45 determines whether or not feature pairs are feature pairs to be used by the error calculation unit 43 to calculate an error. At the time of error calculation, the used feature pair determination unit 45 causes the error calculation unit 43 to preferentially use determined feature pairs, and to also use determined feature and estimated feature pairs if the number of the determined feature pairs is insufficient for error calculation. Likewise, if the addition of the number of the determined feature and estimated feature pairs is still insufficient for error calculation, the used feature pair determination unit 45 causes the error calculation unit 43 to also use estimated feature pairs. Specifically, the used feature pair determination unit 45 determines, on the basis of a preset use threshold, whether feature pairs to which priorities have been given are to be used for error calculation. The preset use threshold is a threshold to determine whether or not to use feature pairs.

The error calculation unit 43 calculates an error in the dynamic map information on the basis of a high-priority own vehicle surrounding information feature point and a high-priority dynamic map information feature point. The high-priority own vehicle surrounding information feature is an own vehicle surrounding information feature point, and the high-priority dynamic map information feature point is a dynamic map information feature point, that own vehicle surrounding information feature and that dynamic map information feature point forming one or more feature pairs with a high priority determined by the used feature pair determination unit 45 to be used for error calculation. The error calculation unit 43 calculates averages and variances of position information errors, speed information errors, and time information errors in the feature pairs extracted by the feature pair priority determination unit 42. Of the errors having large average values exceeding preset allowable errors, the errors having the smallest variance are identified as dominant errors between the vehicle coordinate dynamic map information and the own vehicle surrounding information at that time. The high-priority own vehicle surrounding information feature point is an example of a high-priority own mobile object surrounding information feature point, and the high-priority dynamic map information feature point is an example of a high-priority map information feature point.

Specifically, for example, the error calculation unit 43 calculates a position information error average value, a speed information error average value, and a time information error average value on the basis of differences between information included in the high-priority own vehicle surrounding information feature points and position information on the high-priority dynamic map information feature points corresponding to that information. The position information error average value is the average value of errors in the position information on the dynamic map information feature points. The speed information error average value is the average value of errors in the speed information on the dynamic map information feature points. The time information error average value is the average value of errors in the time information on the dynamic map information feature points. The error calculation unit 43 may identify, as an error, at least one of the position information error average value, the speed information error average value, and the time information error average value, so far.

The error calculation unit 43 calculates a position information error variance value, a speed information error variance value, and a time information error variance value on the basis of differences between information included in the high-priority own vehicle surrounding information feature points and information included in the high-priority dynamic map information feature points corresponding to that information. The position information error variance value is the variance value of the errors in the position information on the dynamic map information feature points. The speed information error variance value is the variance value of the errors in the speed information on the dynamic map information feature points. The time information error variance value is the variance value of the errors in the time information on the dynamic map information feature points. The error calculation unit 43 may identify, as an error, the average value of the information on the feature points having the smallest variance among the position information error variance value, the speed information error variance value, and the time information error variance value, so far.

The error calculation unit 43 determines whether or not at least one of the position information error average value, the speed information error average value, and the time information error average value is within an allowable error range. If the error calculation unit 43 determines that at least one of the position information error average value, the speed information error average value, and the time information error average value is out of the allowable error range, the error calculation unit 43 identifies, as an error, the average value of the information on the feature points having the smallest variance among the average values of information on the feature points determined to be out of the allowable error ranges.

The correction unit 44 corrects the dynamic map information, using an error calculated by the error calculation unit 43. The correction unit 44 corrects the vehicle coordinate dynamic map information by adding or subtracting a dominant error average value to or from the vehicle coordinate dynamic map information. The correction results are reflected in the own vehicle surrounding information, which is output as reflection information to the control unit 37. In addition, to transmit correction dynamic map information to the map information creation apparatus 2, the correction unit 44 transmits the corrected vehicle coordinate dynamic map information and the dynamic map information priority information to the coordinate transformation unit 36.

Next, a hardware configuration of the map information correction apparatus 4 according to the first embodiment will be described.

Figure 6:
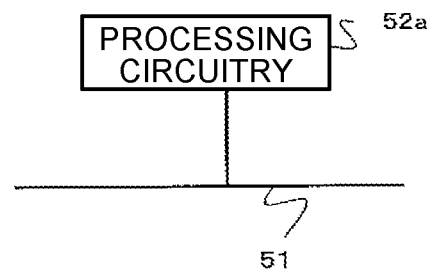
FIG. 6 is a hardware configuration diagram of a map information correction apparatus according to the first embodiment.

FIG. 6 is a hardware configuration diagram of the map information correction apparatus 4 according to the first embodiment. A configuration of the map information correction apparatus 4 according to the first embodiment will be described with reference to FIG. 6.

The map information correction apparatus 4 includes a bus 51 and processing circuitry 52a.

The bus 51 is a signal path that electrically connects devices to each other for data exchange.

The processing circuitry 52a is, for example, a single circuit, a combined circuit, a programmed processor, a parallel-programmed processor, an application specific integrated circuit (ASIC), a field-programmable gate array (FPGA), or a combination thereof. The processing circuitry 52a implements the functions of the units, the feature point priority determination unit 41, the feature pair priority determination unit 42, the used feature pair determination unit 45, the error calculation unit 43, and the correction unit 44 together by processing circuitry. The processing circuitry 52a may implement the respective functions of the feature point priority determination unit 41, the feature pair priority determination unit 42, the used feature pair determination unit 45, the error calculation unit 43, and the correction unit 44 by separate processing circuitry.

Figure 7:
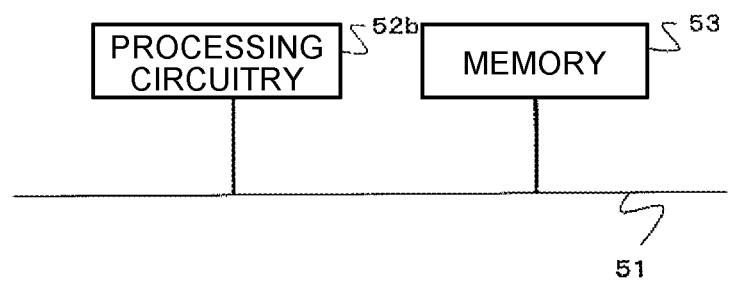
FIG. 7 is another hardware configuration diagram of the map information correction apparatus according to the first embodiment.

FIG. 7 is another hardware configuration diagram of the map information correction apparatus 4 according to the first embodiment. Another configuration of the map information correction apparatus 4 will be described with reference to FIG. 7.

The map information correction apparatus 4 includes a bus 51, processing circuitry 52b, and a memory 53. The functions of the map information correction apparatus 4 are implemented by software, firmware, or a combination of software and firmware. Software, firmware, or a combination of software and firmware is described as a program.

The bus 51 is a signal path that electrically connects devices to each other for data exchange as in FIG. 6.

The processing circuitry 52b is a central processing unit (CPU) that executes a program stored in the memory 53. The CPU is connected to the other devices via the bus 51 to control these units. The CPU that is the processing circuitry 52b reads and executes the program in the memory 53. The CPU that is the processing circuitry 52b loads at least part of an OS stored in the memory 53 and executes the program while running the OS. The CPU is an integrated circuit (IC) that performs processing. The CPU may be a central processor, a processing unit, an arithmetic unit, a microprocessor, a microcomputer, a processor, or a digital signal processor (DSP). The feature point priority determination unit 41, the feature pair priority determination unit 42, the used feature pair determination unit 45, the error calculation unit 43, and the correction unit 44 are implemented by the processing circuitry 52b reading and executing the program loaded in the memory 53.

The memory 53 stores the program in which software, firmware, or a combination of software and firmware is described. In addition, the memory 53 stores dynamic map information, dynamic map information priority information, own vehicle surrounding information, corrected dynamic map information, corrected dynamic map information priority information, a priority table in which priorities are stored, etc. The memory 53 is, for example, nonvolatile or volatile semiconductor memory such as random-access memory (RAM), read-only memory (ROM), flash memory, an erasable programmable read-only memory (EPROM), an electrically erasable programmable read-only memory (EEPROM), or a hard disk drive (HDD), or a portable recording medium such as a magnetic disk, a flexible disk, an optical disk, a compact disk, a mini disk, or a digital versatile disc (DVD), or the like. The memory 53 also stores the operating system (OS). The feature point priority determination unit 41, the feature pair priority determination unit 42, the used feature pair determination unit 45, the error calculation unit 43, and the correction unit 44 are implemented by the program stored in the memory 53. The memory 53 may implement the respective functions of the feature point priority determination unit 41, the feature pair priority determination unit 42, the used feature pair determination unit 45, the error calculation unit 43, and the correction unit 44 by separate memories.

Information on the units etc. is stored in the memory 53 or a register or a cache memory in the CPU that is the processing circuitry 52b.

The memory 53 may be a storage medium. The memory 53 may be a combination of a memory and a storage medium.

Further, for the functions of the feature point priority determination unit 41, the feature pair priority determination unit 42, the used feature pair determination unit 45, the error calculation unit 43, and the correction unit 44 of the map information correction apparatus 4, some may be implemented by dedicated hardware, and some may be implemented by software or firmware. For example, for the feature point priority determination unit 41, the feature pair priority determination unit 42, the used feature pair determination unit 45, and the error calculation unit 43, their functions may be implemented by processing circuitry as dedicated hardware, and for the correction unit 44, its function may be implemented by a CPU that is processing circuitry reading and executing a program stored in a memory. Processing circuitry can implement the functions of the map information correction apparatus 4 by hardware, software, firmware, or a combination thereof.

The apparatuses and devices of the map information correction system 1 are connected via communication. Communication used may be wired communication or wireless communication.

Next, the operation of the vehicle 3 including the map information correction apparatus 4 will be described.

FIG. 8 is a flowchart illustrating the operation of the vehicle 3 including the map information correction apparatus 4 according to the first embodiment. The operation of the vehicle 3 including the map information correction apparatus 4 will be described below with reference to FIG. 8.

In step S101, the transmission and reception unit 35 receives dynamic map information and dynamic map information priority information from the map information creation apparatus 2. The transmission and reception unit 35 transmits, to the coordinate transformation unit 36, the dynamic map information and the dynamic map information priority information received from the map information creation apparatus 2.

In step S102, the coordinate transformation unit 36 coordinate-transforms the coordinates of the dynamic map information received from the transmission and reception unit 35 into vehicle coordinates equivalent to those of own vehicle surrounding information. Specifically, the coordinates are converted into coordinates that center the own vehicle. The coordinate transformation unit 36 transmits, to the feature pair priority determination unit 42 and the correction unit 44, vehicle coordinate dynamic map information with the coordinates transformed into the vehicle coordinates and the dynamic map information priority information.

In step S103, the sensor information acquisition unit 38 acquires sensor information acquired by sensors of the GPS 31, the camera 32, the Lidar 33, and the Radar 34, and transmits the sensor information to the feature point priority determination unit 41.

In step S104, the feature point priority determination unit 41 compiles the sensor information and calculation sensor information calculated from the sensor information into one piece of own vehicle surrounding information. The feature point priority determination unit 41 extracts own vehicle surrounding information feature points and determines own vehicle surrounding information priorities. Specifically, the feature point priority determination unit 41 extracts, as an own vehicle surrounding information feature point, a corner of a vehicle from the own vehicle surrounding information, and determines whether the own vehicle surrounding information feature point is a determined feature point or an estimated feature point. The agreement is made in advance between the map information creation apparatus 2 and the vehicle 3 that the corner of the vehicle is an object stored as a feature point that should be extracted. An agreement may be made in advance between the map information creation apparatus 2 and the vehicle 3 that feature points that should be extracted may be other than the corners and the tail lamps of vehicles, such as the vehicular mirrors, and the vehicular license plates.

FIG. 9 is a priority table 61 in which determined feature points and estimated feature points are stored according to the first embodiment.

Using the previously stored priority table 61 of FIG. 9 in which the determined feature points and the estimated feature points are stored, the feature point priority determination unit 41 determines whether the own vehicle surrounding information feature point is a determined feature point or an estimated feature point. The feature point priority determination unit 41 has stored own vehicle surrounding information feature points in the priority table 61. For example, the own vehicle surrounding information feature point directly measured from a sensor installed on the vehicle is stored as a determined feature point in the priority table 61. The own vehicle surrounding information feature point detected as a result of direct measurement by a sensor of low reliability, or estimated from the size of a mobile object or another feature point is stored as an estimated feature point in the priority table 61.

In the case of an own vehicle surrounding information feature point extracted from the own vehicle surrounding information on the basis of sensor information acquired by the GPS 31, for example, the feature point priority determination unit 41 gives that extracted feature point own vehicle surrounding information priority information that the feature point is a determined feature point, consulting the priority table 61 that stores the determined feature points and the estimated feature points of FIG. 9.

In the case of an own vehicle surrounding information feature point extracted from the own vehicle surrounding information on the basis of vehicle type information acquired by the camera 32, the feature point priority determination unit 41 gives that extracted feature point own vehicle surrounding information priority information that the feature point is a determined feature point, consulting the priority table 61 that stores the determined feature points and the estimated feature points of FIG. 9.

In the case of an own vehicle surrounding information feature point extracted from the own vehicle surrounding information on the basis of vehicle corner information acquired by the Lidar 33, the feature point priority determination unit 41 gives that extracted feature point own vehicle surrounding information priority information that the feature point is a determined feature point, consulting the priority table 61 that stores the determined feature points and the estimated feature points of FIG. 9.

In the case of, for example, an own vehicle surrounding information feature point extracted from the own vehicle surrounding information on the basis of sensor information acquired by the Radar 34 with low reliability, the feature point priority determination unit 41 gives that extracted feature point own vehicle surrounding information priority information that the feature point is an estimated feature point, consulting the priority table 61 that stores the determined feature points and the estimated feature points of FIG. 9.

In the case of an own vehicle surrounding information feature point of the own vehicle surrounding information calculated from sensor information of the GPS 31 and sensor information of the camera 32, the feature point priority determination unit 41 gives that calculated feature point own vehicle surrounding information priority information that the feature point is an estimated feature point, consulting the priority table 61 that stores the determined feature points and the estimated feature points of FIG. 9. The vehicle surrounding information feature point calculated from the sensor information of the GPS 31 and the sensor information of the camera 32 is, for example, a vehicle surrounding information feature point calculated from position information acquired from the GPS 31 and information on the size of a mobile object acquired from the camera 32, or the like.

In the case of an own vehicle surrounding information feature point estimated from another own vehicle surrounding information feature point, the feature point priority determination unit 41 gives that estimated feature point own vehicle surrounding information priority information that the feature point is an estimated feature point, consulting the priority table 61 that stores the determined feature points and the estimated feature points of FIG. 9.

FIG. 10 is an example 62 of a part of the own vehicle surrounding information to which the priority of a feature point is given according to the first embodiment.

The example 62 of the part of the own vehicle surrounding information to which the own vehicle surrounding information priority has been given includes own vehicle surrounding information priority information 63, an own vehicle surrounding information feature point 64, position information 65, speed information 66, and time information 67. The own vehicle surrounding information priority information 63 indicates either a determined feature point or an estimated feature point. Note that the own vehicle surrounding information 62 is not limited to this and does not need to store all of the own vehicle surrounding information priority information 63, the own vehicle surrounding information feature point 64, the position information 65, the speed information 66, and the time information 67, and may not store the speed information 66, for example.

Returning to FIG. 8, the feature point priority determination unit 41 transmits, to the feature pair priority determination unit 42 and the correction unit 44, the own vehicle surrounding information to which the own vehicle surrounding information priorities have been given.

In step S105, the feature pair priority determination unit 42 receives the vehicle coordinate dynamic map information and the dynamic map information priority information from the coordinate transformation unit 36, and receives, from the feature point priority determination unit 41, the own vehicle surrounding information to which the own vehicle surrounding information priorities have been given. The feature pair priority determination unit 42 compares determined feature points of the dynamic map information priority information with determined feature points of the own vehicle surrounding information to which the own vehicle surrounding information priorities have been given, and extracts corresponding determined feature points as determined feature pairs.

The feature pair priority determination unit 42 determines that feature points correspond to each other, for example, when a feature point related to a license plate extracted from information acquired from the camera 32 corresponds to a feature point related to the vehicular license plate included in the dynamic map information. Another example is where, when feature points of a corner of a large vehicle match, and factors such as position information and speed information are within preset ranges, these feature points are determined as corresponding to each other. When surrounding feature points correspond to each other, and pieces of position information match, the feature pair priority determination unit 42 may determine the feature points to correspond to each other. The feature pair priority determination unit 42 transmits extracted feature pairs to the used feature pair determination unit 45.

In step S106, the used feature pair determination unit 45 determines whether or not a preset desired number of determined feature pairs, which is a determined feature pair number, have been extracted. For example, assume that the used feature pair determination unit 45 has determined that a determined feature pair number threshold, which is the required number of determined feature pairs to be used by the error calculation unit 43 for error calculation, is six. If six or more determined feature pairs have been extracted (step S106: Yes), the used feature pair determination unit 45 transmits, to the error calculation unit 43, the vehicle coordinate dynamic map information, the dynamic map information priority information, and the own vehicle surrounding information to which the own vehicle surrounding information priorities have been given. The process then proceeds to step S110. If only less than six determined feature pairs have been extracted (step S106: No), the used feature pair determination unit 45 instructs the feature pair priority determination unit 42 to transmit additional feature pairs, and the process proceeds to step S107.

In step S107, the feature pair priority determination unit 42 compares determined feature points of the dynamic map information priority information with estimated feature points of the own vehicle surrounding information to which the own vehicle surrounding information priorities have been given, and extracts corresponding feature points as determined feature and estimated feature pairs. Alternatively, the feature pair priority determination unit 42 compares estimated feature points of the dynamic map information priority information with determined feature points of the own vehicle surrounding information to which the own vehicle surrounding information priorities have been given, and extracts corresponding feature points as determined feature and estimated feature pairs. That is, the feature pair priority determination unit 42 extracts determined feature and estimated feature pairs each of which has a determined feature point in one of the dynamic map information priority information and the own vehicle surrounding information to which the own vehicle surrounding information priorities have been given, and an estimated feature point is in the other. A method of determining that feature points to correspond to each other is similar to that in step S105.

In step S108, the used feature pair determination unit 45 determines whether or not the number of the extracted determined feature and estimated feature pairs satisfies the number by which the feature pairs are short of the preset desired number of determined feature pairs. For example, assume that the used feature pair determination unit 45 has determined that the required number of determined feature pairs to be used by the error calculation unit 43 for error calculation is six, and two determined feature pairs have been extracted in step S106. Thus, the number of the determined feature pairs is four less than the desired number of determined feature pairs. In this case, if four or more determined feature and estimated feature pairs have been extracted, the used feature pair determination unit 45 determines that the desired number of feature pairs have been extracted (step S108: Yes), transmits, to the error calculation unit 43, the vehicle coordinate dynamic map, the dynamic map information priority information, and the own vehicle surrounding information to which the own vehicle surrounding information priorities have been given. The process then proceeds to step S110. If only less than four determined feature and estimated feature pairs have been extracted (step S108: No), the used feature pair determination unit 45 instructs the feature pair priority determination unit 42 to transmit additional feature pairs, and the process proceeds to step S109.

In step S109, the feature pair priority determination unit 42 compares estimated feature points of the dynamic map information priority information with estimated feature points of the own vehicle surrounding information to which the own vehicle surrounding information priorities have been given, and extracts corresponding feature points as estimated feature pairs. A method of determining that feature points correspond to each other is similar to that in step S105. The feature pair priority determination unit 42 transmits, to the error calculation unit 43 via the used feature pair determination unit 45, the vehicle coordinate dynamic map information, the dynamic map information priority information, and the own vehicle surrounding information to which the own vehicle surrounding information priorities have been given.

An own vehicle surrounding information feature point and a dynamic map information feature point, which form a determined feature pair, are referred to as a high-priority own vehicle surrounding information feature point and a high-priority dynamic map information feature point, respectively.

Although the feature pairs of high-priority are limited only to determined feature pairs in the above specific example, the feature pairs of high-priority may be determined feature pairs and determined feature and estimated feature pairs.

In step S110, the error calculation unit 43 calculates, as errors in the dynamic map information feature points, differences between the dynamic map information feature points and the own vehicle surrounding information feature points from the feature pairs extracted by the feature pair priority determination unit 42. Assume that at least one of the own vehicle surrounding information and the dynamic map information includes position information, speed information, and time information, as information on the feature points. The error calculation unit 43 calculates position information errors, speed information errors, and time information errors, individually, of the feature pairs extracted by the feature pair priority determination unit 42. The error calculation unit 43 calculates a position information error average value and a position information error variance value from the position information errors. The error calculation unit 43 calculates a speed information error average value and a speed information error variance value from the speed information errors. The error calculation unit 43 calculates a time information error average value and a time information error variance value from the time information errors.

Specifically, if the used feature pair determination unit 45 determines that the number of the determined feature pairs satisfies the determined feature pair number threshold, the error calculation unit 43 calculates, as errors, differences between the dynamic map information feature points and the own vehicle surrounding information feature points that form the determined feature pairs. If the used feature pair determination unit 45 determines that the number of the determined feature pairs does not satisfy the determined feature pair number threshold, the error calculation unit 43 further calculates, as errors, differences between the dynamic map information feature points and the own vehicle surrounding information feature points that form the determined feature and estimated feature pairs.

Further, if the used feature pair determination unit 45 determines that the number of the determined feature pairs and the determined feature and estimated feature pairs satisfies the determined feature pair number threshold, the error calculation unit 43 calculates, as errors, differences between the dynamic map information feature points and the own vehicle surrounding information feature points that form the determined feature pairs and the determined feature and estimated feature pairs. If the used feature pair determination unit 45 determines that the number of the determined feature pairs and the determined feature and estimated feature pairs does not satisfy the determined feature pair number threshold, the error calculation unit 43 further calculates, as errors, differences between the dynamic map information feature points and the own vehicle surrounding information feature points that form the estimated feature pairs.

In step S111, the error calculation unit 43 determines whether or not the position information error average value, the speed information error average value, and the time information error average value are within respective preset allowable error ranges. When the error calculation unit 43 determines that all of the position information error average value, the speed information error average value, and the time information error average value are within the allowable error ranges, the error calculation unit 43 transmits within-allowable-range information to the correction unit 44. The within-allowable-range information is that all of the position information error average value, the speed information error average value, and the time information error average value are within the allowable error ranges (step S111: Yes). The process then proceeds to step S112.

On the other hand, if the error calculation unit 43 determines that at least one of the position information error average value, the speed information error average value, and the time information error average value is out of the allowable error range, the error calculation unit 43 extracts errors whose average value is out of the allowable error range and whose variance is the smallest. The extracted errors are identified as dominant errors. The error calculation unit 43 transmits information on the extracted dominant errors to the correction unit 44 (step S111: No), and the process proceeds to step S114.

Note that a method of selecting dominant errors is not limited to the above.

In step S112, when receiving the within-allowable-range information from the error calculation unit 43, the correction unit 44 reflects the vehicle coordinate dynamic map information and the dynamic map information priority information, received from the coordinate transformation unit 36, in the own vehicle surrounding information given the own vehicle surrounding information priorities, received from the feature point priority determination unit 41. This is because the dynamic map information feature points including errors within the allowable ranges are used as they are for own vehicle control. The correction unit 44 transmits, to the control unit 37, reflection information in which the vehicle coordinate dynamic map information and the dynamic map information priority information are reflected in the own vehicle surrounding information to which the own vehicle surrounding information priorities have been given.

In step S113, the control unit 37 performs control of the own vehicle such as path setting in automatic driving, using the reflection information received from the correction unit 44.

On the other hand, when the correction unit 44 receives the information on the dominant errors from the error calculation unit 43 in step S114, the correction unit 44 corrects the vehicle coordinate dynamic map information by subtracting the average value of the dominant errors from the vehicle coordinate dynamic map information received from the coordinate transformation unit 36. This is because errors included in the dynamic map information feature points should be corrected. Although, in this embodiment, the vehicle coordinate dynamic map information is corrected by subtracting the average value of the dominant errors from the vehicle coordinate dynamic map information, in some cases, the correction is made by, for example, addition rather than subtraction. A correction method is not limited to subtraction.

In step S115, the correction unit 44 reflects the corrected vehicle coordinate dynamic map information and the dynamic map information priority information in the own vehicle surrounding information given the own vehicle surrounding information priorities, received from the feature point priority determination unit 41. At the time of the reflection, the correction unit 44 may assign a greater weight to feature points having higher reliability among corresponding feature points of the corrected vehicle coordinate dynamic map information and the own vehicle surrounding information. If the priorities are determined feature points and estimated feature points, or the like, the correction unit 44 may preferentially use determined feature points for the reflection. The correction unit 44 transmits, to the control unit 37, reflection information in which the corrected vehicle coordinate dynamic map information and the correction dynamic map information priority information are reflected in the own vehicle surrounding information to which the own vehicle surrounding information priorities have been given. In addition, the correction unit 44 transmits the corrected vehicle coordinate dynamic map information and the correction dynamic map information priority information to the coordinate transformation unit 36.

In step S116, as in step S113, the control unit 37 performs control of the own vehicle such as path setting in automatic driving, using the reflection information received from the correction unit 44.

In step S117, the coordinate transformation unit 36 coordinate-transforms the corrected vehicle coordinate dynamic map information received from the correction unit 44, into map coordinate dynamic map information. The coordinate transformation unit 36 transmits correction map coordinate dynamic map information and the corrected dynamic map information priority information to the transmission and reception unit 35. The correction map coordinate dynamic map information is the corrected map coordinate dynamic map information.

In step S118, the transmission and reception unit 35 transmits, to the map information creation apparatus 2, the correction map coordinate dynamic map information and the correction dynamic map information priority information received from the coordinate transformation unit 36.

After the execution of step S113 or step S118, the process returns to step S101 to repeat the processing as described above until there is a trigger for finishing the processing such as turning off the power or performing a finishing operation, whereby the dynamic map information can be corrected. The processing as described above, which is repeated, may be performed only once instead of being repeated.

Figure 11:
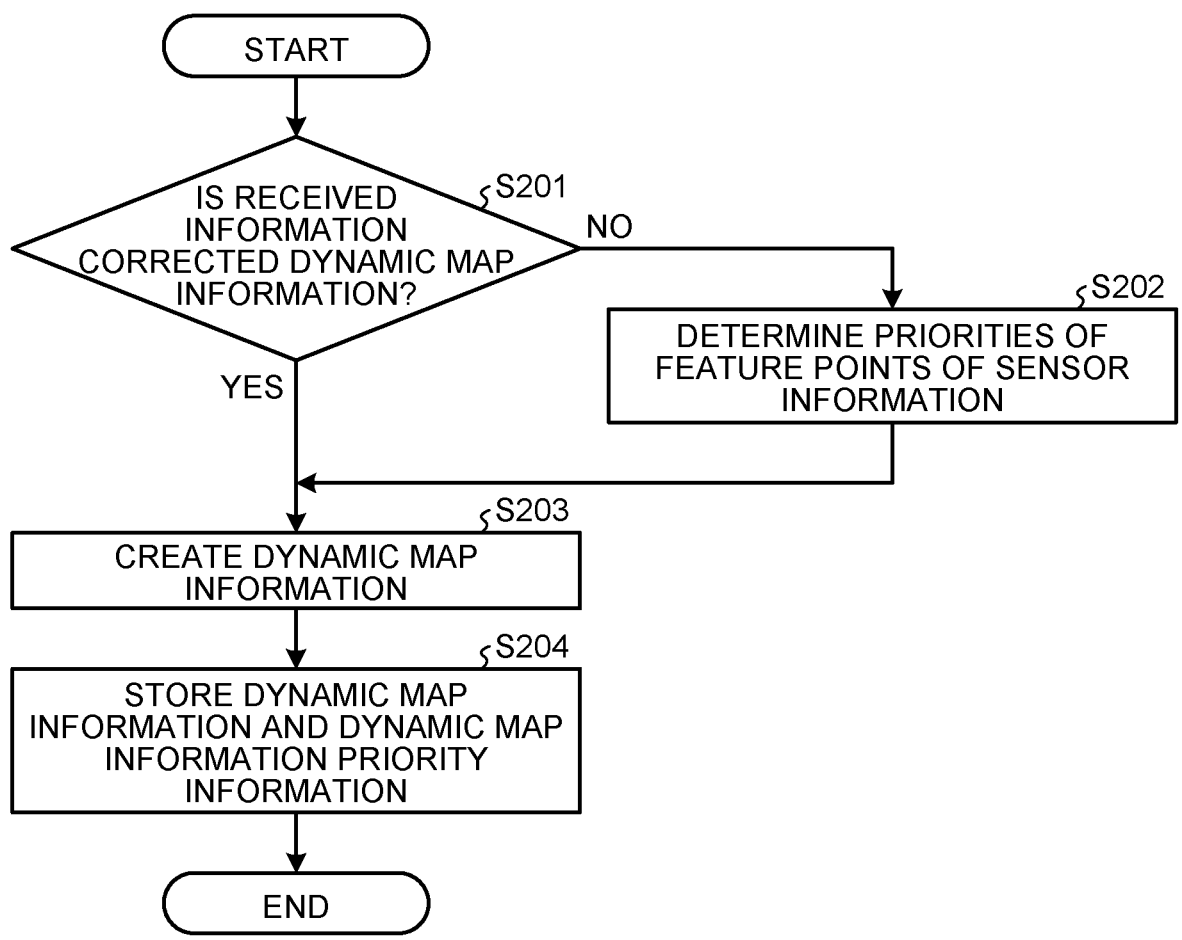
FIG. 11 is a flowchart illustrating the operation of a map information creation apparatus when receiving correction dynamic map information according to the first embodiment.

FIG. 11 is a flowchart illustrating the operation of the map information creation apparatus 2 when receiving correction dynamic map information according to the first embodiment. The operation of the map information creation apparatus 2 when receiving correction dynamic map information will be described below with reference to FIG. 11.

In step S201, the transmission and reception unit 22 receives sensor information transmitted by roadside sensors, and sensor information, correction dynamic map information, and correction dynamic map information priority information transmitted by the vehicle 3. Processing differs depending on whether received information is sensor information or correction dynamic map information and correction dynamic map information priority information. Thus, the transmission and reception unit 22 determines whether or not the received information is correction dynamic map information. The method of determining whether or not the received information is correction dynamic map information includes, for example, giving dynamic map information ID information identifying that dynamic map information, for the transmission and reception unit 22 to determine whether or not the received information is given that ID information, but any other determination method may be used. If the transmission and reception unit 22 determines that the received information is the correction dynamic map information, the transmission and reception unit 22 transmits the correction dynamic map information and correction dynamic map information priority information to the creation unit 24 (step S201: Yes), and the process proceeds to step S203. If the transmission and reception unit 22 determines that the received information is not corrected dynamic map information, the received information is sensor information. Thus, the transmission and reception unit 22 transmits the sensor information to the feature point priority determination unit 23 (step S201: No), and the process proceeds to step S202.

In step S202, the feature point priority determination unit 23 extracts feature points of the sensor information received from the transmission and reception unit 22, and determines priorities. Specifically, as in step S104, the feature point priority determination unit 23 extracts, as a feature point, a corner of a vehicle from the sensor information, and determines whether the feature point is a determined feature point or an estimated feature point. The agreement is made in advance between the map information creation apparatus 2 and the vehicle 3 that the corner of the vehicle is an object stored as a feature point that should be extracted. An agreement may be made in advance between the map information creation apparatus 2 and the vehicle 3 that feature points that should be extracted may be other than the corners of vehicles, such as the vehicular mirrors, and the vehicular license plates. The sensor information received from the transmission and reception unit 22 is later used to create or update dynamic map information. A feature point of the sensor information will become a dynamic map information feature point, and the priority of a feature point of the sensor information will become a dynamic map information priority. Thus, a feature point of the sensor information is referred to as a dynamic map information feature point, and the priority of a feature point of the sensor information as a dynamic map information priority. The feature point priority determination unit 23 determines whether a dynamic map information feature point of the sensor information is a determined feature point or an estimated feature point, using the priority table 61 stored in advance in the storage unit 21, in which table 61 stores the determined feature points and the estimated feature points of FIG. 9. The storage unit 21 has stored dynamic map information feature points in the priority table 61. For example, the dynamic map information feature point directly measured from a sensor installed on the vehicle is stored as a determined feature point in the priority table 61. The dynamic map information feature point detected as a result of direct measurement by a sensor of low reliability, or estimated from the size of a mobile object or another dynamic map information feature point is stored as an estimated feature point in the priority table 61. The storage unit 21 has additionally stored, in the priority table 61 in which the determined feature points and the estimated feature points are stored, a determined feature point that is a dynamic map information feature point directly measured from a sensor of particularly high reliability such as a roadside sensor installed on roads or at a building.

Regarding the determination of the priority of a feature point, in the case of a dynamic map information feature point extracted on the basis of sensor information acquired by the GPS, for example, the feature point priority determination unit 23 gives that extracted feature point dynamic map information priority information that the feature point is a determined feature point, consulting the priority table 61 that stores the determined feature points and the estimated feature points of FIG. 9.

In the case of a dynamic map information feature point extracted on the basis of vehicle type information acquired by the camera, the feature point priority determination unit 23 gives that extracted feature point dynamic map information priority information that the feature point is a determined feature point, consulting the priority table 61 that stores the determined feature points and the estimated feature points of FIG. 9.

In the case of a dynamic map information feature point extracted on the basis of vehicle corner information acquired by the Lidar, the feature point priority determination unit 23 gives that extracted feature point dynamic map information priority information that the feature point is a determined feature point, consulting the priority table 61 that stores the determined feature points and the estimated feature points of FIG. 9.

In the case of, for example, a dynamic map information feature point extracted on the basis of sensor information acquired by the Radar with low reliability, the feature point priority determination unit 23 gives that extracted feature point dynamic map information priority information that the feature point is an estimated feature point, consulting the priority table 61 that stores the determined feature points and the estimated feature points of FIG. 9.

In the case of a dynamic map information feature point calculated from sensor information of the GPS and sensor information of the camera, the feature point priority determination unit 23 gives that calculated feature point dynamic map information priority information that the feature point is an estimated feature point, consulting the priority table 61 that stores the determined feature points and the estimated feature points of FIG. 9. The dynamic map information feature point calculated from the sensor information of the GPS and the sensor information of the camera is, for example, a feature point calculated from position information acquired from the GPS and information on the size of a mobile object acquired from the camera, or the like.

In the case of a dynamic map information feature point estimated from another dynamic map information feature point, the feature point priority determination unit 23 gives that estimated feature point dynamic map information priority information that the feature point is an estimated feature point, consulting the priority table 61 that stores the determined feature points and the estimated feature points of FIG. 9.

Although not illustrated in FIG. 9, assume, for example, that a dynamic map information feature point directly measured from a roadside sensor has been stored as a determined feature point in the priority table 61 in which the determined feature points and the estimated feature points are stored. In the case of a dynamic map information feature point extracted on the basis of sensor information acquired by a roadside sensor, the feature point priority determination unit 23 gives that extracted feature point dynamic map information priority information that the feature point is a determined feature point.

Sensor information to which feature point priority information is given is similar to that in FIG. 10.

Returning to FIG. 11, the feature point priority determination unit 23 transmits, to the creation unit 24, the sensor information to which the dynamic map information priority information has been given.

In step S203, the creation unit 24 creates dynamic map information, using at least one of the sensor information given the dynamic map information priority information, and the correction dynamic map information and the correction dynamic map information priority information received from the transmission and reception unit 22 or the feature point priority determination unit 23. The creation unit 24 transmits the created dynamic map information to the storage unit 21.

In step S204, the storage unit 21 stores the created dynamic map information received from the creation unit 24 together with created dynamic map information priority information. The storage unit 21 transmits the dynamic map information and the dynamic map information priority information to the transmission and reception unit 22 when the vehicle 3 requests transmission of the dynamic map information, or according to a fixed cycle or a rule.

By repeating the processing as described above until there is a trigger for finishing the processing such as turning off the power or performing a finishing operation, the dynamic map information can be corrected. The processing as described above, which is repeated, may be performed only once instead of being repeated.

As described above, in the first embodiment, the feature point priority determination unit 41 of the map information correction apparatus 4 determines priorities of own vehicle surrounding information feature points as determined feature points and estimated feature points, the feature pair priority determination unit 42 extracts determined feature pairs, and the error calculation unit 43 and the correction unit 44 correct dynamic map information on the basis of the priorities. Consequently, correction can be performed faster than in conventional techniques with conventional accuracy maintained, and a map with a quick update cycle such as a dynamic map can be corrected.

In the first embodiment, the map information correction apparatus 4 also transmits correction dynamic map information and correction dynamic map information priority information to the map information creation apparatus 2, and the map information creation apparatus 2 reflects the correction dynamic map information in dynamic map information stored. This allows the map information creation apparatus 2 to transmit, to other vehicles, the dynamic map information reflecting the correction dynamic map information and dynamic map information priority information reflecting the correction dynamic map information.

Although the first embodiment uses the one map information creation apparatus 2 and the one vehicle 3, multiple map information creation apparatuses 2 may be used, or multiple vehicles 3 may be used, or multiple map information creation apparatuses 2 and multiple vehicles 3 may be used.

The sensors installed on the vehicle 3 are the GPS 31, the camera 32, the Lidar 33, and the Radar 34, but are not limited thereto. As other sensors, a gyroscope sensor, an acceleration sensor, a geomagnetic sensor, an atmospheric pressure sensor, a vibration sensor, etc. may be used. The number of sensors may be one or more. However, by holding a number of sensors of various types, a relatively wide range of surrounding information except for blind spots can be acquired.

The correction unit 44 of the map information correction apparatus 4 according to the first embodiment does not correct dynamic map information if errors calculated by the error calculation unit 43 are within the allowable ranges, but may correct dynamic map information if errors are calculated.

The error calculation unit 43 of the map information correction apparatus 4 according to the first embodiment calculates speed information errors, time information errors, and position information errors, but is not limited thereto. For example, the error calculation unit 43 may calculate acceleration information errors or the like. In addition, the number of types of errors is not limited to three, and may be one or more.

Although the priority table 61 that stores the determined feature points and the estimated feature points of FIG. 9 has been set and stored in advance in the first embodiment, the priority table 61 may be updated. Alternatively, the priority table 61 may be received from the map information creation apparatus 2 as needed without being stored.

In the first embodiment, in step S106 of FIG. 8, with all the determined feature pairs extracted, the used feature pair determination unit 45 determines whether or not the number of the determined feature pairs satisfies the determined feature pair number threshold. The used feature pair determination unit 45 may determine whether or not the determined feature pair number threshold is satisfied while extracting determined feature pairs, and when the determined feature pair number threshold is satisfied, the process may proceed to the next step.

In the first embodiment, in step S108 of FIG. 8, the used feature pair determination unit 45 determines whether or not the number of the extracted determined feature and estimated feature pairs satisfies the number by which the feature pairs are short of the preset desired number of determined feature pairs. Irrespective of the desired number of determined feature pairs, a determined feature and estimated feature pair threshold, which is a preset use threshold of the desired number of determined feature and estimated feature pairs, may be set also for determined feature and estimated feature pairs.

In the first embodiment, in step S109 of FIG. 8, the used feature pair determination unit 45 does not determine the number of the extracted estimated feature pairs. The used feature pair determination unit 45 may determine whether or not the number of the extracted estimated feature pairs satisfies the number obtained by subtracting the determined feature pairs and the determined feature and estimated feature pairs from the preset determined feature pair number threshold, and use as many estimated feature pairs as the number by which the feature pairs are short. In addition, irrespective of the desired determined feature pair number, the used feature pair determination unit 45 may also set an estimated feature pair threshold for estimated feature pairs, which threshold is a preset use threshold of the desired number of estimated feature pairs.

In the first embodiment, in step S106 of FIG. 8, the used feature pair determination unit 45 has stored the use threshold. The use threshold may be a fixed value, or may be variably set according to the traffic conditions of a target road, the accuracy of sensor information, etc.

Regarding an own vehicle surrounding information feature point that is a determined feature point, in the first embodiment, the feature pair priority determination unit 42 may calculate past position information from speed information and time information, and use the calculated past position information, treating the feature point as the determined feature point. That is, when information on the past of a feature point is calculated, the priority of the feature point is not changed.

Although, in the first embodiment, each of own vehicle surrounding information priority and dynamic map information priority provides two kinds of priorities: a determined feature point; and an estimated feature point, three or more priorities may be provided.

In the first embodiment, the vehicle 3 has been described as an example of a mobile object, and the dynamic map as an example of a map. A mobile object is not limited to a vehicle, and may be another mobile object such as a ship, an aircraft including a drone, or a robot with movement. A map is not limited to a dynamic map, and may be another map as long as it includes information updated using sensor information.

In the first embodiment, the priority of dynamic map information is determined on a feature-point-by-feature-point basis. The priority may be common to all dynamic map information feature points.

Second Embodiment

Figure 12:
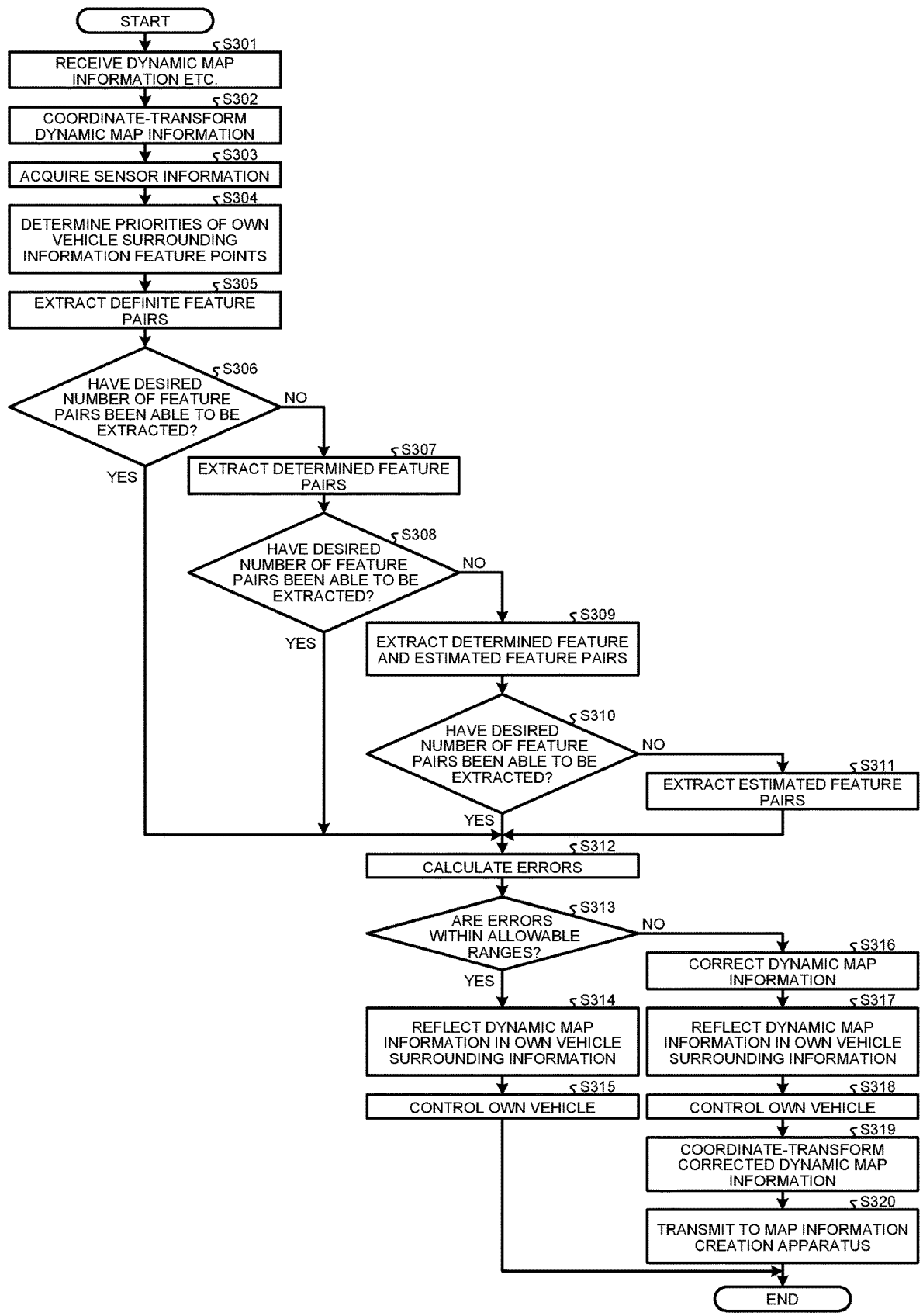
FIG. 12 is a flowchart illustrating the operation of a vehicle including a map information correction apparatus according to a second embodiment.

In the first embodiment, surrounding vehicles are observed from an own vehicle, and dynamic map information is corrected using priority information defined by determined feature points and estimated feature points about the surrounding vehicles. In the second embodiment, as illustrated in FIGS. 12 to 14, the vehicle 3 is measured, and a definite feature point having a higher priority than a determined feature point is provided in addition to a determined feature point and an estimated feature point. When a sensor group that measures sensor information to be received by the map information creation apparatus 2 can measure the vehicle 3, at least some feature points of the vehicle 3 may be identified as "definite feature points" for use in correcting the dynamic map, as a result of comparison between own vehicle surrounding information and dynamic map information. The sensors installed on the vehicle 3 excel in measuring the surroundings of the vehicle 3, but are not necessarily excel in detecting feature points of the vehicle 3. Given that the size and the sensor installation positions, of the vehicle 3 are known, information on the position of a feature point such as a vehicle corner of the vehicle 3 can be accurately obtained from information on the position of installation of the GPS and information on the position of the vehicle 3 measured by the GPS. Using data on the feature point enables the dynamic map information to be corrected to a higher accurate dynamic map information. For these reasons, the map information correction apparatus 4 identifies own vehicle surrounding information feature points on the vehicle 3 as definite feature points having a higher priority than determined feature points, and uses such own vehicle surrounding information feature points for feature pair extraction in preference to the determined feature points. The others are similar to those in the first embodiment.

A functional block diagram of the map information correction system 1 according to the second embodiment is the same as that of FIG. 1 of the first embodiment. Parts partially different in operation will be described below with reference to FIG. 1.

In the second embodiment, the feature point priority determination unit 41 does not determine whether an own vehicle surrounding information feature point is a determined feature point or an estimated feature point, using the priority table 61 of FIG. 9. In the second embodiment, instead, the feature point priority determination unit 41 determines whether an own vehicle surrounding information feature point is a definite feature point, a determined feature point, or an estimated feature point, using a previously stored priority table 68 that stores definite feature points, determined feature points, and estimated feature points of FIG. 13.

The feature point priority determination unit 41 determines whether an own vehicle surrounding information feature point is a definite feature point, a determined feature point, or an estimated feature points, using, for example, a priority table in which definite feature points, determined feature points, and estimated feature points are stored as an own vehicle surrounding information priority. The feature point priority determination unit 41 has stored, in the priority table 68 in which the definite feature points, the determined feature points, and the estimated feature points are stored, for example, at least some feature points of the vehicle 3 as definite feature points having a higher priority than determined feature points. The feature point priority determination unit 41 gives own vehicle surrounding information own vehicle surrounding information priority information that is priority information indicating whether an own vehicle surrounding information feature point is a definite feature point, a determined feature point, or an estimated feature point. The others are similar to those in the first embodiment.

The feature pair priority determination unit 42 extracts corresponding feature points included in the own vehicle surrounding information and the dynamic map information priority information, and extracts feature pairs including definite feature points among the corresponding feature points, as definite feature pairs having a higher priority than determined feature pairs. The feature pair priority determination unit 42 transmits the definite feature pairs to the used feature pair determination unit 45. If the feature pair priority determination unit 42 receives, from the used feature pair determination unit 45, a request to further extract feature pairs to be used for error calculation, the feature pair priority determination unit 42 further extracts determined feature pairs. The others are similar to those in the first embodiment.

A hardware configuration diagram of the map information correction apparatus 4 according to the second embodiment is similar to that of FIG. 6 or 7 of the first embodiment.

FIG. 12 is a flowchart illustrating the operation of the vehicle 3 including the map information correction apparatus 4 according to the second embodiment. The operation of the vehicle 3 including the map information correction apparatus 4 will be described with reference to FIG. 12. In the following description, the same reference numerals are assigned to the configuration and operation already described to omit redundant description.

Steps S301, S302, and S303 are similar to steps S101, S102, and S103 of the first embodiment.

In step S304, the feature point priority determination unit 41 extracts, as an own vehicle surrounding information feature point, a vehicle corner from the own vehicle surrounding information, and determines whether the own vehicle surrounding information feature point is a definite feature point, a determined feature point, or an estimated feature point. The agreement is made in advance between the map information creation apparatus 2 and the vehicle 3 in that the vehicle corner is an object stored as a feature point that should be extracted. The others are similar to those in the first embodiment.

FIG. 13 is the priority table 68 in which the definite feature points, the determined feature points, and the estimated feature points are stored according to the second embodiment.

The feature point priority determination unit 41 determines whether the own vehicle surrounding information feature point is a definite feature point, a determined feature point, or an estimated feature point, using the previously stored priority table 68 that stores the definite feature points, the determined feature points, and the estimated feature points of FIG. 13. The feature point priority determination unit 41 has stored, in the priority table 68 in which the definite feature points, the determined feature points, and the estimated feature points are stored, for example, at least some feature points of the vehicle 3 as definite feature points having a higher priority than determined feature points. The determined feature points and the estimated feature points are similar to those in the first embodiment.

For example, assume that the feature point priority determination unit 41 calculates information on the position of a vehicle corner of the vehicle 3 from position information that is sensor information acquired by the GPS 31 and the vehicle size of the vehicle 3 in the own vehicle surrounding information. In the case of an own vehicle surrounding information feature point extracted on the basis of the calculated information on the position of the vehicle corner of the vehicle 3, the feature point priority determination unit 41 gives that extracted feature point own vehicle surrounding information priority information that the feature point is a definite feature point, consulting the priority table 68 that stores the definite feature points, the determined feature points, and the estimated feature points of FIG. 12. The own vehicle surrounding information to which the priority of the feature point has been given differs from that of the first embodiment only in that the own vehicle surrounding information priority information 63 of the example 62 of the part of the own vehicle surrounding information given the priority of the feature point in FIG. 10 in the first embodiment is replaced with the own vehicle surrounding information priority information 63 indicating one of a definite feature point, a determined feature point, or an estimated feature point.

Returning to FIG. 12, in step S305, the feature pair priority determination unit 42 compares determined feature points of the dynamic map information priority information with definite feature points of the own vehicle surrounding information to which the own vehicle surrounding information priorities have been given, and extracts, as definite feature pairs, determined feature points and definite feature points corresponding to each other.

In step S306, the used feature pair determination unit 45 determines whether or not a preset desired number of definite feature pairs, which is a definite feature pair number, have been extracted. For example, assume that the used feature pair determination unit 45 has determined that a definite feature pair number threshold, which is the required number of definite feature pairs to be used by the error calculation unit 43 for error calculation, is six. If six or more definite feature pairs have been extracted (step S306: Yes), the used feature pair determination unit 45 transmits, to the error calculation unit 43, the vehicle coordinate dynamic map information, the dynamic map information priority information, and the own vehicle surrounding information to which the own vehicle surrounding information priorities have been given. The process then proceeds to step S312. If only less than six definite feature pairs have been extracted (step S306: No), the used feature pair determination unit 45 instructs the feature pair priority determination unit 42 to transmit additional feature pairs, and the process proceeds to step S307.

Step S307 is similar to step S105 in the first embodiment.

In step S308, the used feature pair determination unit 45 determines whether or not the number of the extracted determined feature pairs satisfies the number by which the feature pairs are short of the preset desired number of definite feature pairs. For example, assume that the used feature pair determination unit 45 has determined that the required number of definite feature pairs to be used by the error calculation unit 43 for error calculation is six, and two definite feature pairs have been extracted in step S306. Thus, the number of the definite feature pairs is four less than the desired number of definite feature pairs. In this case, if four or more determined feature pairs have been extracted, the used feature pair determination unit 45 determines that the desired number of feature pairs have been extracted (step S308: Yes), transmits, to the error calculation unit 43, the vehicle coordinate dynamic map, the dynamic map information priority information, and the own vehicle surrounding information to which the own vehicle surrounding information priorities have been given. The process then proceeds to step S312. If only less than four determined feature pairs have been extracted (step S308: No), the used feature pair determination unit 45 instructs the feature pair priority determination unit 42 to transmit additional feature pairs, and the process proceeds to step S309.

Steps S309, S310, and S311 are similar to steps S107, S108, and S109 of the first embodiment. It should be noted that the used feature pair determination unit 45 makes determination on the basis of the desired number of definite feature pairs, not on the desired number of determined feature pairs.

An own vehicle surrounding information feature point and a dynamic map information feature point, which form a definite feature pair, are referred to as a high-priority own vehicle surrounding information feature point and a high-priority dynamic map information feature point, respectively.

Although high-priority feature pairs are limited only to definite feature pairs in the above specific example, high-priority feature pairs may be definite feature pairs and determined feature pairs. Alternatively, high-priority feature pairs may be definite feature pairs, determined feature pairs, and determined feature and estimated feature pairs.

In step S312, if the used feature pair determination unit 45 determines that the number of the definite feature pairs satisfies the definite feature pair number threshold, the error calculation unit 43 calculates, as errors, differences between the dynamic map information feature points and the own vehicle surrounding information feature points that form the definite feature pairs. If the used feature pair determination unit 45 determines that the number of the definite feature pairs does not satisfy the definite feature pair number threshold, the error calculation unit 43 further calculates, as errors, differences between the dynamic map information feature points and the own vehicle surrounding information feature points that form the determined feature pairs.

If the used feature pair determination unit 45 determines that the number of the definite feature pairs and the determined feature pairs satisfies the definite feature pair number threshold, the error calculation unit 43 calculates, as errors, differences between the dynamic map information feature points and the own vehicle surrounding information feature points that form the definite feature pairs and the determined feature pairs. If the used feature pair determination unit 45 determines that the number of the definite feature pairs and the determined feature pairs does not satisfy the definite feature pair number threshold, the error calculation unit 43 further calculates, as errors, differences between the dynamic map information feature points and the own vehicle surrounding information feature points that form the determined feature and estimated feature pairs.

If the used feature pair determination unit 45 determines that the number of the definite feature pairs, the determined feature pairs, and the determined feature and estimated feature pairs satisfies the definite feature pair number threshold, the error calculation unit 43 calculates, as errors, differences between the dynamic map information feature points and the own vehicle surrounding information feature points that form the definite feature pairs, the determined feature pairs, and the determined feature and estimated feature pairs. If the used feature pair determination unit 45 determines that the number of the definite feature pairs, the determined feature pairs, and the determined feature and estimated feature pairs does not satisfy the definite feature pair number threshold, the error calculation unit 43 further calculates, as errors, differences between the dynamic map information feature points and the own vehicle surrounding information feature points that form the estimated feature pairs. The others are similar to those in the first embodiment.

Steps S313, S314, S315, and S316 are similar to steps S111, S112, S113, and S114 of the first embodiment.

In step S317, at the time of the reflection, the correction unit 44 may assign a greater weight to feature points having higher reliability among corresponding feature points between the corrected vehicle coordinate dynamic map information and the own vehicle surrounding information. If the priorities are definite feature points, determined feature points, and estimated feature points, or the like, the correction unit 44 may preferentially use definite feature points and then determined feature points for the reflection. The others are similar to those in the first embodiment.

Steps S318, S319, and S320 are similar to steps S116, S117, and S118 of the first embodiment.

After the execution of step S315 or step S320, the process returns to step S301 to repeat the processing as described above until there is a trigger for finishing the processing such as turning off the power or performing a finishing operation, whereby the dynamic map information can be corrected. The processing as described above, which is repeated, may be performed only once instead of being repeated.

As described above, in the second embodiment, the feature point priority determination unit 41 of the map information correction apparatus 4 determines the priorities of own vehicle surrounding information feature points as definite feature points, determined feature points, and estimated feature points, the feature pair priority determination unit 42 extracts definite feature pairs, and the error calculation unit 43 and the correction unit 44 correct dynamic map information on the basis of the priorities. Some feature points of an own mobile object that can be obtained with high accuracy are identified as definite feature points having a higher priority than determined feature points, so that the dynamic map information can be corrected more accurately than in the first embodiment.

In the second embodiment, as in the first embodiment, the map information correction apparatus 4 also transmits correction dynamic map information and correction dynamic map information priority information to the map information creation apparatus 2, and the map information creation apparatus 2 reflects the correction dynamic map information in dynamic map information stored. This allows the map information creation apparatus 2 to transmit, to other vehicles, the dynamic map information reflecting the correction dynamic map information and dynamic map information priority information reflecting the correction dynamic map information.

Although the second embodiment uses the one map information creation apparatus 2 and the one vehicle 3, multiple map information creation apparatuses 2 may be used, or multiple vehicles 3 may be used, or multiple map information creation apparatuses 2 and multiple vehicles 3 may be used.

The sensors installed on the vehicle 3 are the GPS 31, the camera 32, the Lidar 33, and the Radar 34, but are not limited thereto. As other sensors, a gyroscope sensor, an acceleration sensor, a geomagnetic sensor, an atmospheric pressure sensor, a vibration sensor, etc. may be used. The number of sensors may be one or more. However, by holding a number of sensors of various types, a relatively wide range of surrounding information except for blind spots can be acquired.

The correction unit 44 of the map information correction apparatus 4 according to the second embodiment does not correct dynamic map information if errors calculated by the error calculation unit 43 are within the allowable ranges, but may correct dynamic map information if errors are calculated.

The error calculation unit 43 of the map information correction apparatus 4 according to the second embodiment calculates speed information errors, time information errors, and position information errors, but is not limited thereto. For example, the error calculation unit 43 may calculate acceleration information errors or the like. In addition, the number of types of errors is not limited to three, and may be one or more.

In the second embodiment, in step S306 of FIG. 12, with all the definite feature pairs extracted, the used feature pair determination unit 45 determines whether or not the number of the definite feature pairs satisfies the definite feature pair number threshold. The used feature pair determination unit 45 may determine whether or not the definite feature pair number threshold is satisfied while extracting definite feature pairs, and when the definite feature pair number threshold is satisfied, the process may proceed to the next step.

In the second embodiment, in step S308 and step S310 of FIG. 12, the used feature pair determination unit 45 determines whether or not the number of the determined feature pairs or the number of the determined feature and estimated feature pairs extracted satisfies the number by which the feature pairs are short of the preset desired number of definite feature pairs. Irrespective of the desired number of definite feature pairs, a determined feature pair threshold or a determined feature and estimated feature pair threshold, which is a preset use threshold of a desired number of determined feature pairs or determined feature and estimated feature pairs, may be set also for determined feature pairs or determined feature and estimated feature pairs.

In the second embodiment, in step S311 of FIG. 12, the used feature pair determination unit 45 does not determine the number of the extracted estimated feature pairs. The used feature pair determination unit 45 may determine whether or not the number of the extracted estimated feature pairs satisfies the number obtained by subtracting the definite feature pairs, the determined feature pairs, and the determined feature and estimated feature pairs from the preset definite feature pair number threshold, and use as many estimated feature pairs as the number by which the feature pairs are short. In addition, irrespective of the desired determined feature pair number, the used feature pair determination unit 45 may also set an estimated feature pair threshold for estimated feature pairs, which threshold is a preset use threshold of a desired number of estimated feature pairs.

In the second embodiment, in step S306 of FIG. 12, the used feature pair determination unit 45 has stored the use threshold. The use threshold may be a fixed value, or may be variably set according to the traffic conditions of a target road, the accuracy of sensor information, etc.

Regarding an own vehicle surrounding information feature point that is a definite feature point, in the second embodiment, the feature pair priority determination unit 42 may calculate past position information from speed information and time information and use the calculated past position information, treating the feature point as the definite feature point. That is, when information on the past of a feature point is calculated, the priority of the feature point is not changed.

In the second embodiment, the vehicle 3 has been described as an example of a mobile object, and the dynamic map as an example of a map. A mobile object is not limited to a vehicle, and may be another mobile object such as a ship, an aircraft including a drone, or a robot with movement. A map is not limited to a dynamic map, and may be another map as long as it includes information updated using sensor information.

In the second embodiment, the priority of dynamic map information is determined on a feature-point-by-feature-point basis. The priority may be common to all dynamic map information feature points.

In the second embodiment, the priority table 68 that stores the definite feature points, the determined feature points, and the estimated feature points of FIG. 13 is set and stored in advance. The priority table 68 may be updated. Alternatively, the priority table 68 may be received from the map information creation apparatus 2 as needed without being stored.

In the second embodiment, when a sensor group that measures sensor information which the map information creation apparatus 2 receives to create dynamic map information sees the vehicle 3, the feature point priority determination unit 41 identifies at least some feature points of the vehicle 3 as definite feature points for use in correcting the dynamic map. At least some feature points of the vehicle 3 may be identified as determined feature points. In this case, at least some feature points of the vehicle 3 calculated from another information also have a higher priority. It is similar to the first embodiment except that at least some feature points of the vehicle 3 are identified as determined feature points.

Although in the second embodiment, the own vehicle surrounding information priorities and the dynamic map information priorities are classified into three degrees named as a definite feature point, a determined feature point, and an estimated feature point, four or more priorities may be provided. Alternatively, the priority of the feature point may be classified, for example, into numerical or alphabetical levels.

FIG. 14 is another example 69 of a priority table in which the priorities of feature points are stored according to the second embodiment.

The feature point priority determination unit 41 may give a priority number to each feature point as in FIG. 14. In the example of FIG. 14, the smaller the priority number, the higher the priority. Alternatively, the larger the number, the higher the priority may be. In the example of FIG. 14, the priorities are from 1 to 3, but four or more priorities may be provided. Although in the example of FIG. 14, the priorities of feature points are represented by numbers, the priority of the feature point may be classified, for example, into alphabetical levels.

According to the disclosure, feature points are prioritized, so that a short-period updated map including dynamic information such as a dynamic map can be corrected.

The map information correction apparatus, the mobile object, the map information creation apparatus, the map information correction system, the map information correction method, and the map information correction program described in the above embodiments are merely an example, and can be combined with another apparatus as appropriate, and are not limited to the configuration of each embodiment alone.

What is claimed is:

1. A map information correction apparatus comprising:
    feature point priority determination circuitry to determine, on a basis of a preset priority table, a priority for one or more feature points of own mobile object surrounding information including at least one of sensor information acquired from a sensor installed on an own mobile object and calculation sensor information calculated from the sensor information;
    feature pair priority determination circuitry to give, when there is one or more feature pairs, a priority to the feature pair on the basis of an own mobile object surrounding information priority and a map information priority, the feature pair being a pair of an own mobile object surrounding information feature point and a map information feature point that correspond to each other, the own mobile object surrounding information feature point being the feature point of the own mobile object surrounding information, the map information feature point being a feature point of map information received, the own mobile object surrounding information priority being a priority of the own mobile object surrounding information feature point of the feature pair, the map information priority being a priority of the map information feature point of the feature pair;
    error calculation circuitry to calculate an error in the map information on the basis of a high-priority own mobile object surrounding information feature point and a high-priority map information feature point, the high-priority own mobile object surrounding information feature point being the own mobile object surrounding information feature point, the high-priority map information feature point being the map information feature point, the own mobile object surrounding information feature point and the map information feature point forming the one or more feature pairs of a high priority; and
    correction circuitry to correct the map information using the error, to output the corrected map information to the own mobile object, and to control movement of the own mobile object along a path according to the corrected map information.

2. The map information correction apparatus according to claim 1, further comprising:
    used feature pair determination circuitry to determine, on the basis of a preset use threshold, whether or not to use the feature pair to which the priority has been given, the preset use threshold being a threshold to determine whether or not to use the feature pair in calculation of the error, wherein
    the error calculation circuitry calculates the error on the basis of the high-priority own mobile object surrounding information feature point and the high-priority map information feature point of the feature pair determined by the used feature pair determination circuitry to be used.

3. The map information correction apparatus according to claim 2, wherein
    the feature point of the sensor information is a determined feature point, and the feature point of the calculation sensor information is an estimated feature point having a lower priority than the determined feature point,
    the feature point priority determination circuitry determines whether the own mobile object surrounding information feature point is the determined feature point or the estimated feature point, on the basis of the priority table,
    the feature pair priority determination circuitry determines that the own mobile object surrounding information feature point and the map information feature point are a determined feature pair when each of the own mobile object surrounding information feature point and the map information feature point is the determined feature point, that the own mobile object surrounding information feature point and the map information feature point are a determined feature and estimated feature pair having a lower priority than the determined feature pair when one of the own mobile object surrounding information feature point and the map information feature point is the determined feature point and the other is the estimated feature point, and that the own mobile object surrounding information feature point and the map information feature point are an estimated feature pair having a lower priority than the determined feature and estimated feature pair when each of the own mobile object surrounding information feature point and the map information feature point is the estimated feature point,
    the used feature pair determination circuitry determines whether or not the number of the determined feature pairs satisfies a determined feature pair number threshold that is the preset use threshold, and
    the error calculation circuitry calculates the error in the determined feature pair when the used feature pair determination circuitry determines that the number of the determined feature pairs satisfies the determined feature pair number threshold, and further calculates the error in the determined feature and estimated feature pair when the used feature pair determination circuitry determines that the number of the determined feature pairs does not satisfy the determined feature pair number threshold.

4. The map information correction apparatus according to claim 3, wherein
    in the priority table, at least some of the feature points of the own mobile object are identified as the determined feature points, and
    the feature point priority determination circuitry determines, for the own mobile object surrounding information feature points, that at least some of the feature points of the own mobile object are the determined feature points.

5. The map information correction apparatus according to claim 2, wherein
the feature point of the sensor information is a determined feature point, the feature point of the calculation sensor information is an estimated feature point having a lower priority than the determined feature point, and at least some of the feature points of the own mobile object are each a definite feature point having a higher priority than the determined feature point,
the feature point priority determination circuitry determines whether the own mobile object surrounding information feature point is the determined feature point, the estimated feature point, or the definite feature point, based on the priority table,
the feature pair priority determination circuitry determines that the own mobile object surrounding information feature point and the map information feature point are a determined feature pair when each of the own mobile object surrounding information feature point and the map information feature point is the determined feature point, that the feature pair is a definite feature pair having a higher priority than the determined feature pair when the feature pair includes the definite feature point, that the own mobile object surrounding information feature point and the map information feature point are a determined feature and estimated feature pair having a lower priority than the determined feature pair when one of the own mobile object surrounding information feature point and the map information feature point is the determined feature point and the other is the estimated feature point, and that the own mobile object surrounding information feature point and the map information feature point are an estimated feature pair having a lower priority than the determined feature and estimated feature pair when each of the own mobile object surrounding information feature point and the map information feature point is the estimated feature point,
the used feature pair determination circuitry determines whether or not the number of the definite feature pairs satisfies a definite feature pair number threshold that is the preset use threshold, and
the error calculation circuitry calculates the error in the definite feature pair when the used feature pair determination circuitry determines that the number of the definite feature pairs satisfies the definite feature pair number threshold, and further calculates the error in the determined feature pair when the used feature pair determination circuitry determines that the number of the definite feature pairs does not satisfy the definite feature pair number threshold.

6. The map information correction apparatus according to claim 2, wherein
the use threshold is variable depending on traffic conditions or accuracy of the sensor information.

7. The map information correction apparatus according to claim 1, wherein
at least one of the own mobile object surrounding information and the map information includes speed information on the feature point and time information on the feature point, and
when past position information is calculated from the speed information and the time information, the feature pair priority determination circuitry does not change the priority of the feature point corresponding to the calculated past position information.

8. The map information correction apparatus according to claim 1, wherein
at least one of the own mobile object surrounding information and the map information includes position information, speed information, and time information as information on the feature points, and
the error calculation circuitry calculates a position information error average value, a speed information error average value, and a time information error average value on the basis of differences between information included in the high-priority own mobile object surrounding information feature points and information on the high-priority map information feature points corresponding to the information, the position information error average value being an average value of errors in the position information on the map information feature points, the speed information error average value being an average value of errors in the speed information on the map information feature points, the time information error average value being an average value of errors in the time information on the map information feature points, and the error calculation circuitry identifies, as the error, at least one of the position information error average value, the speed information error average value, and the time information error average value.

9. The map information correction apparatus according to claim 8, wherein
the error calculation circuitry calculates a position information error variance value, a speed information error variance value, and a time information error variance value on the basis of differences between information included in the high-priority own mobile object surrounding information feature points and information included in the high-priority map information feature points corresponding to the information, the position information error variance value being a variance value of errors in the position information on the map information feature points, the speed information error variance value being a variance value of errors in the speed information on the map information feature points, the time information error variance value being a variance value of errors in the time information on the map information feature points, and the error calculation circuitry identifies, as the error, the average value of the information on the feature points having the smallest variance among the position information error variance value, the speed information error variance value, and the time information error variance value.

10. The map information correction apparatus according to claim 9, wherein
the error calculation circuitry determines whether or not at least one of the position information error average value, the speed information error average value, and the time information error average value is within an individual preset allowable error range, and when at least one of the position information error average value, the speed information error average value, and the time information error average value is determined to be out of the allowable error range, identifies, as the error, the average value of the information on the feature points having the smallest variance among the average values of the information on the feature points determined to be out of the allowable error ranges.

11. A mobile object comprising:
the map information correction apparatus according to claim 1;
sensor information acquisition circuitry to acquire the sensor information from the sensor;
transmission and reception circuitry to receive the map information;
coordinate transformation circuitry to coordinate-transform coordinates of the map information into coordinates corresponding to the own mobile object surrounding information; and
control circuitry to control movement of the own mobile object along the path, using the own mobile object surrounding information reflecting the map information corrected by the correction circuitry.

12. A map information correction system comprising:
the mobile object according to claim 11; and
a map information creation apparatus connected to the mobile object via communication, wherein
the transmission and reception circuitry to receive at least one of sensor information and correction map information that is map information corrected and correction map information priority information that is priority information on a feature point of the correction map information;
the feature point priority determination circuitry to determine a priority for the one or more feature points of the sensor information, on a basis of a preset priority table when the transmission and reception circuitry receives the sensor information; and
creation circuitry to create the map information, using at least one of the sensor information to which information on the priority of the feature point has been given, and the correction map information and the correction map information priority information, and
the transmission and reception circuitry of the mobile object transmits the correction map information to the map information creation apparatus.

13. A map information correction method comprising:
determining, on a basis of a preset priority table, a priority for one or more feature points of own mobile object surrounding information including at least one of sensor information acquired from a sensor installed on an own mobile object and calculation sensor information calculated from the sensor information;
giving, when there is one or more feature pairs, a priority to the feature pair on the basis of an own mobile object surrounding information priority and a map information priority, the feature pair being a pair of an own mobile object surrounding information feature point and a map information feature point that correspond to each other, the own mobile object surrounding information feature point being the feature point of the own mobile object surrounding information, the map information feature point being a feature point of map information received, the own mobile object surrounding information priority being a priority of the own mobile object surrounding information feature point of the feature pair, the map information priority being a priority of the map information feature point of the feature pair;
calculating an error in the map information, on the basis of a high-priority own mobile object surrounding information feature point and a high-priority map information feature point, the high-priority own mobile object surrounding information feature point being the own mobile object surrounding information feature point, the high-priority map information feature point being the map information feature point, the own mobile object surrounding information feature point and the map information feature point forming the one or more feature pairs of a high priority;
correcting the map information using the error;
outputting the corrected map information to the own mobile object; and
controlling movement of the own mobile object along a path according to the corrected map information.

14. A control circuit to cause a map information correction apparatus to perform:
processing to determine, on a basis of a preset priority table, a priority for one or more feature points of own mobile object surrounding information including at least one of sensor information acquired from a sensor installed on an own mobile object and calculation sensor information calculated from the sensor information;
processing to give, when there is one or more feature pairs, a priority to the feature pair on the basis of an own mobile object surrounding information priority and a map information priority, the feature pair being a pair of an own mobile object surrounding information feature point and a map information feature point that correspond to each other, the own mobile object surrounding information feature point being the feature point of the own mobile object surrounding information, the map information feature point being a feature point of map information received, the own mobile object surrounding information priority being a priority of the own mobile object surrounding information feature point of the feature pair, the map information priority being a priority of the map information feature point of the feature pair;
processing to calculate an error in the map information on the basis of a high-priority own mobile object surrounding information feature point and a high-priority map information feature point, the high-priority own mobile object surrounding information feature point being the own mobile object surrounding information feature point, the high-priority map information feature point being the map information feature point, the own mobile object surrounding information feature point and the map information feature point forming the one or more feature pairs of a high priority;
processing to correct the map information using the error;
processing to output the corrected map information to the own mobile object to facilitate the control of movement of the own mobile object along a path according to the corrected map information; and
processing to control movement of the own mobile object along the path according to the corrected map information.

15. A non-transitory storage medium storing a map information correction program to perform:
processing to determine, on a basis of a preset priority table, a priority for one or more feature points of own mobile object surrounding information including at least one of sensor information acquired from a sensor installed on an own mobile object and calculation sensor information calculated from the sensor information;
processing to give, when there is one or more feature pairs, a priority to the feature pair on the basis of an own mobile object surrounding information priority and a map information priority, the feature pair being a pair of an own mobile object surrounding information feature point and a map information feature point that correspond to each other, the own mobile object surrounding information feature point being the feature point of the own mobile object surrounding information, the map information feature point being a feature point of map information received, the own mobile object surrounding information priority being a priority of the own mobile object surrounding information feature point of the feature pair, the map information priority being a priority of the map information feature point of the feature pair;

processing to calculate an error in the map information on the basis of a high-priority own mobile object surrounding information feature point and a high-priority map information feature point, the high-priority own mobile object surrounding information feature point being the own mobile object surrounding information feature point, the high-priority map information feature point being the map information feature point, the own mobile object surrounding information feature point and the map information feature point forming the one or more feature pairs of a high priority;

processing to correct the map information using the error;

processing to output the corrected map information to the own mobile object to facilitate the control of movement of the own mobile object along a path according to the corrected map information; and processing to control movement of the own mobile object along the path according to the corrected map information.

* * * * *